(12) United States Patent
Hasegawa et al.

(10) Patent No.: US 7,693,035 B2
(45) Date of Patent: Apr. 6, 2010

(54) OFDM RECEIVING METHOD AND OFDM RECEIVING APPARATUS

(75) Inventors: Tsuyoshi Hasegawa, Kawasaki (JP); Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1458 days.

(21) Appl. No.: 10/792,515

(22) Filed: Mar. 2, 2004

(65) Prior Publication Data

US 2004/0228272 A1 Nov. 18, 2004

(51) Int. Cl.
H04J 11/00 (2006.01)
H04L 12/28 (2006.01)
H04L 27/00 (2006.01)

(52) U.S. Cl. .................. 370/208; 370/412; 375/324

(58) Field of Classification Search ........... 370/204, 370/208, 209, 210, 205, 503, 509, 510, 350, 370/506, 519, 517, 203, 329, 342; 375/343, 375/362, 260, 364, 366
See application file for complete search history.

(56) References Cited

U.S. PATENT DOCUMENTS

| 6,711,123 B1 * | 3/2004 | Taira | 370/208 |
| 6,993,083 B1 * | 1/2006 | Shirakata et al. | 375/260 |
| 6,993,084 B1 * | 1/2006 | Eberlein et al. | 375/260 |

FOREIGN PATENT DOCUMENTS

| JP | 10-75229 | 3/1998 |
| JP | 10-224319 | 8/1998 |
| JP | 11-284596 | 10/1999 |
| JP | 2000-22657 | 1/2000 |
| JP | 2000-115087 | 4/2000 |

OTHER PUBLICATIONS

Sadayuki Abeta, et al. Performance of Coherent Multi-Carrier/DS-CDMA and MC-CDMA for Broadband Packet Wireless Access. IEICE Trans. Commun., Mar. 2001, pp. 406-414, vol. E84-B, No. 3.
Shinsuke Hara, et al. Overview of Multicarrier CDMA. IEEE Communications Magazine. Dec. 1997, pp. 126-133.
International Search Report dated Nov. 13, 2001, from the corresponding International Application No. PCT/JP01/08487.
International Preliminary Examination Report dated Apr. 17, 2002 from the corresponding International Application No. PCT/JP01/08487.
Notification of Reasons for Refusal dated Aug. 25, 2009, from the corresponding Japanese Application No. 2003-53580.
Notification of Reasons for Refusal dated Jan. 5, 2010 from the corresponding Japanese Application No. 2003-535380.

* cited by examiner

Primary Examiner—Hanh Nguyen
(74) Attorney, Agent, or Firm—Katten Muchin Rosenman LLP

(57) ABSTRACT

In an OFDM receiving apparatus for receiving a signal that has undergone Orthogonal Frequency Division Multiplexing (OFDM) and applying FFT processing to the receive signal to demodulate transmit data, an OFDM symbol comprising a fixed number of items of sample data is extracted from a receive signal, a position at which FFT processing of the OFDM symbol starts is shifted based upon the state of multipath and FFT processing is executed from the position to which the shift has been made. For example, a channel estimation value is obtained from result of FFT processing of known data contained in the receive signal, a multipath delay profile is obtained by applying FFT processing to this channel estimation value, and the position at which the FFT processing begins is decided based upon the position of a path for which power is maximized among the delay profiles.

11 Claims, 19 Drawing Sheets

FIG. 1
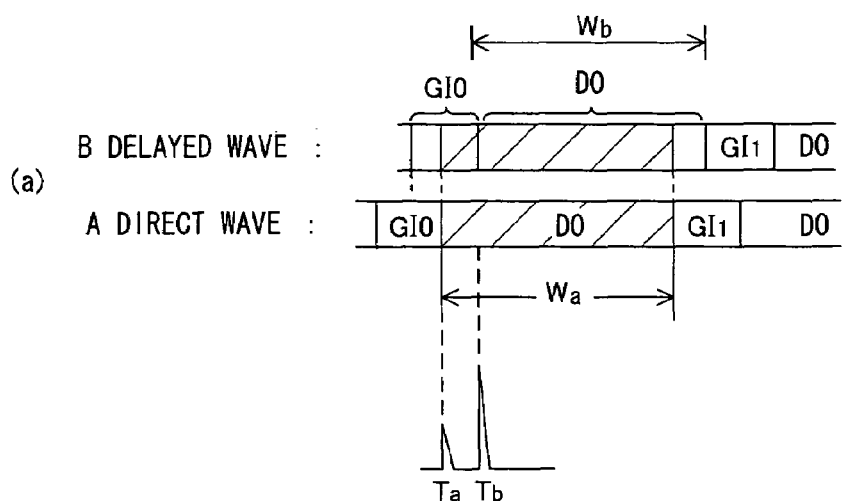
(a)
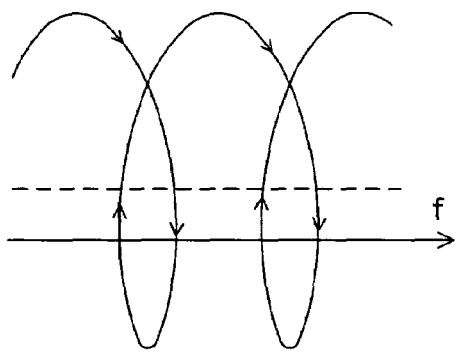
(b)
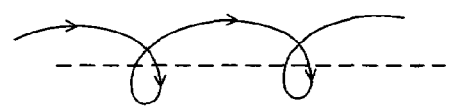
(c)
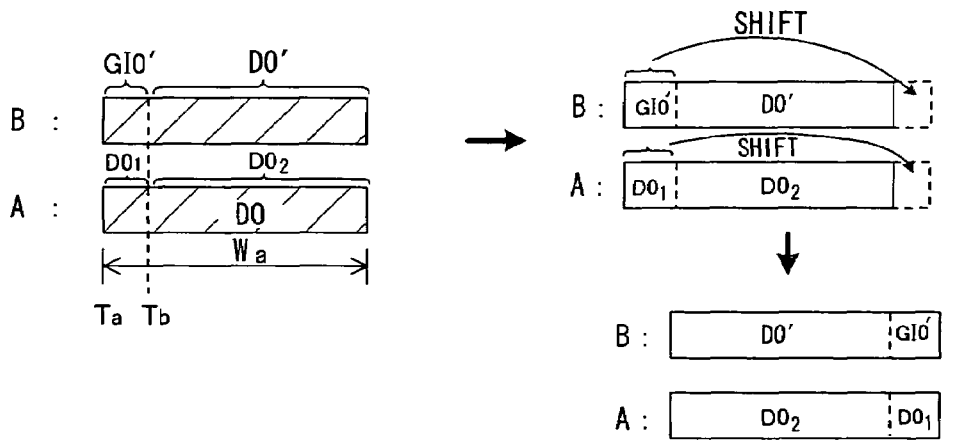
(d)

FIG. 4
(a)
EXAMPLE OF DELAY PROFILE
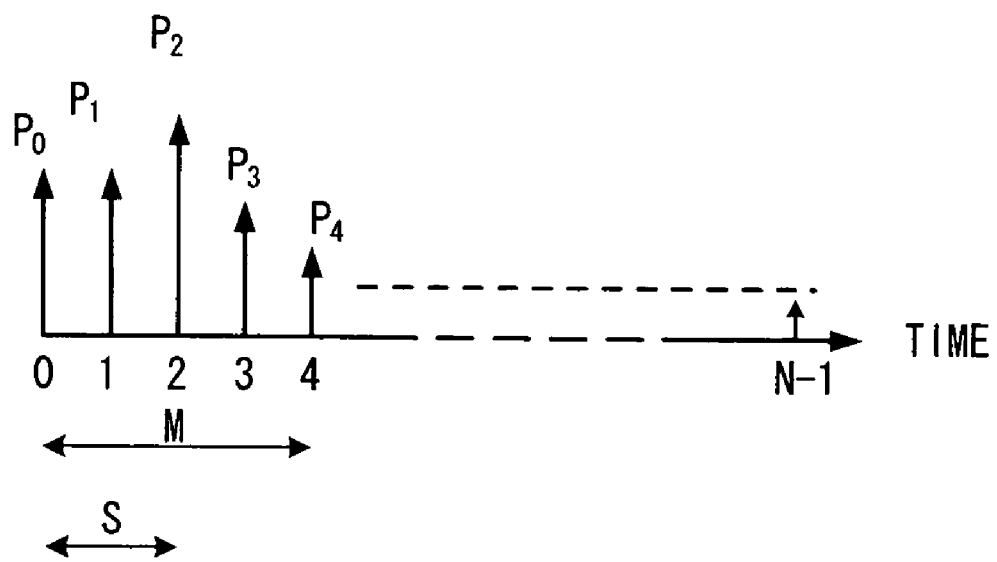
(b)
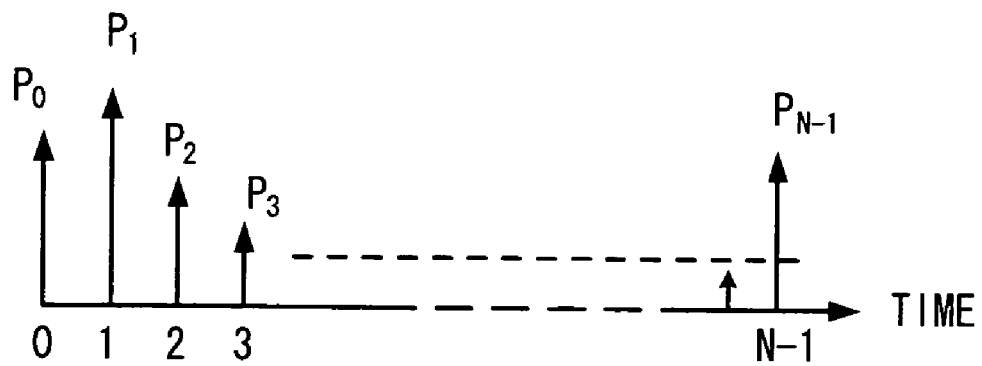

FIG. 6
(a)
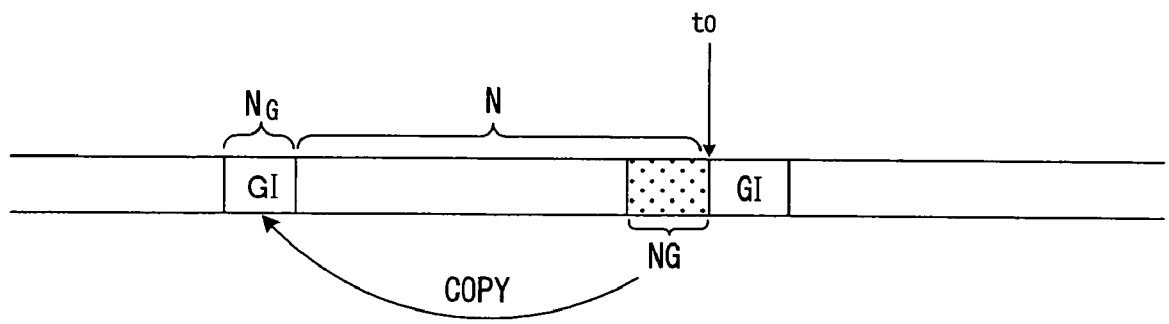
(b)
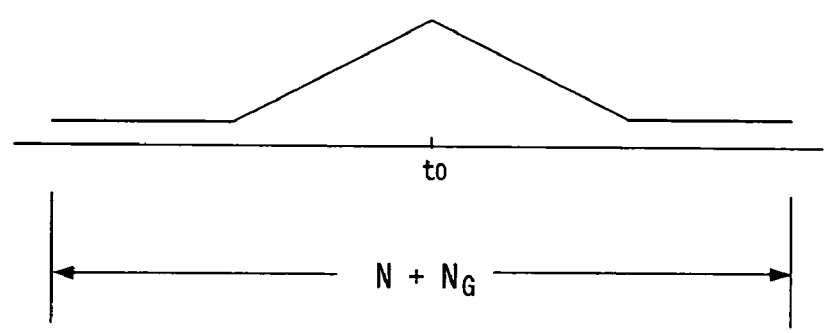
(c)
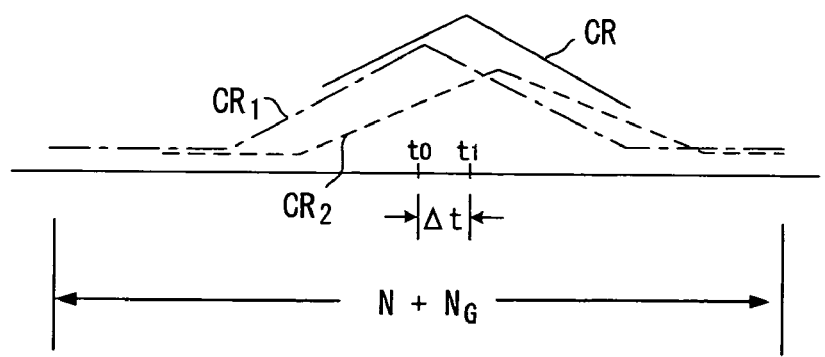

FIG. 10
(a)
IN CASE OF
TWO PATHS
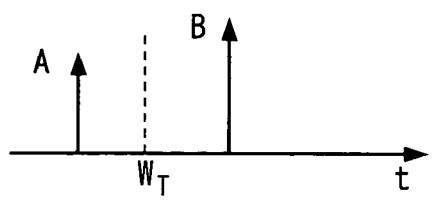
(b) DELAY PROFILE
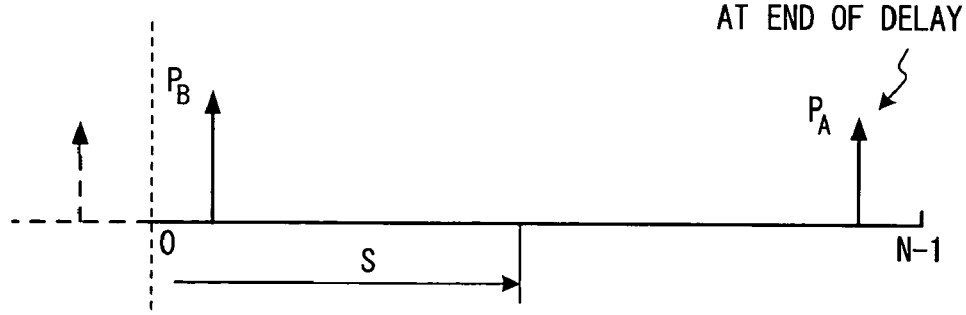
PATH EARLIER THAN FFT
WINDOW TIMING APPEARS
AT END OF DELAY PROFILE
(c) Sp DELAY PROFILE AFTER SHIFT
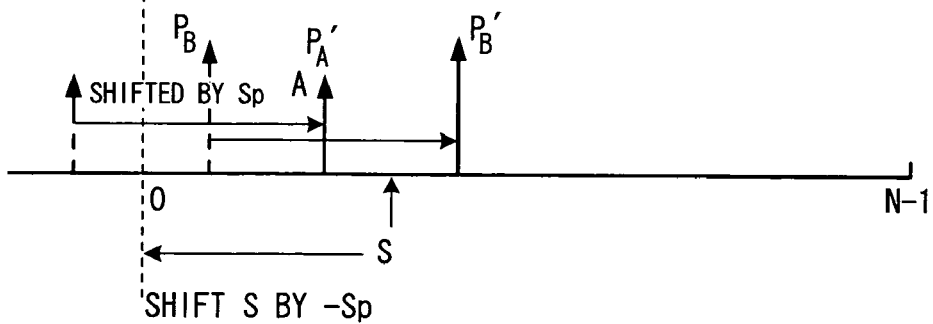

OFDM RECEIVING METHOD AND OFDM RECEIVING APPARATUS

BACKGROUND OF THE INVENTION

This invention relates to an OFDM receiving method and an OFDM receiving apparatus. More particularly, the invention relates to an OFDM receiving method and OFDM receiving apparatus for receiving a signal multiplexed according to Orthogonal Frequency Division Multiplexing (OFDM) and applying FFT processing to the receive signal to demodulate transmit data.

Multicarrier modulation schemes have become the focus of attention as next-generation mobile communication schemes. Using multicarrier modulation not only makes it possible to implement wideband, high-speed data transmission but also enables the effects of frequency-selective fading to be mitigated by narrowing the band of each subcarrier. Further, using orthogonal frequency division multiplexing not only makes it possible to raise the efficiency of frequency utilization but also enables the effects of inter-symbol interference to be eliminated by providing a guard interval for every OFDM symbol.

(a) of FIG. 12 is a diagram useful in describing a multicarrier transmission scheme. A serial/parallel converter 1 converts serial data to parallel data and inputs the parallel data to orthogonal modulators 3a to 3d via low-pass filters 2a to 2d, respectively. In the Figure, the conversion is to parallel data comprising four symbols. Each symbol includes an in-phase component and a quadrature component. The orthogonal modulators 3a to 3d subject each of the symbols to orthogonal modulation by subcarriers having frequencies $f_1$ to $f_4$ illustrated in (b) of FIG. 12, a combiner 4 combines the orthogonally modulated signals and a transmitter (not shown) up-converts the combined signal to a high-frequency signal and then transmits the high-frequency signal. With the multicarrier transmission scheme, the frequencies are arranged, as shown at (b), in such a manner that the spectrums will not overlap in order to satisfy the orthogonality of the subcarriers.

In orthogonal frequency division multiplexing, frequency spacing is arranged so as to null the correlation between a modulation band signal transmitted by an nth subcarrier of a multicarrier transmission and a modulation band signal transmitted by an (n+1)th subcarrier. (a) of FIG. 13 is a diagram of the structure of a transmitting apparatus that relies upon the orthogonal frequency division multiplexing scheme. A serial/parallel converter 5 converts serial data to parallel data comprising a plurality of symbols (I+jQ, which is a complex number). An IDFT (Inverse Discrete Fourier Transform) 6, which is for the purpose of transmitting the symbols as subcarriers having a frequency spacing shown in (b) of FIG. 13, applies an inverse discrete Fourier transform to the frequency data to effect a conversion to time data, and inputs the real and imaginary parts to an orthogonal modulator 8 through low-pass filters 7a, 7b. The orthogonal modulator 8 subjects the input data to orthogonal modulation, and a transmitter (not shown) up-converts the modulated signal to a high-frequency signal. In accordance with orthogonal frequency division multiplexing, a frequency placement of the kind shown in (b) of FIG. 13 becomes possible, thereby enabling an improvement in the efficiency with which frequency is utilized.

In recent years, there has been extensive research in multicarrier CDMA schemes (MC-CDMA) and application thereof to next-generation wideband mobile communications is being studied. With MC-CDMA, partitioning into a plurality of subcarriers is achieved by serial-to-parallel conversion of transmit data and spreading of orthogonal codes in the frequency domain. Owing to frequency-selective fading, subcarriers distanced by their frequency spacing experience independent fading on an individual basis. Accordingly, by causing code-spread subcarrier signals to be distributed along the frequency axis by frequency interleaving, a despread signal can acquire frequency-diversity gain.

An orthogonal frequency/code division multiple access (OFDM/CDMA) scheme, which is a combination of OFDM and MC-CDMA, also is being studied. This is a scheme in which a signal, which has been divided into subcarriers by MC-CDMA, is subjected to orthogonal frequency multiplexing to raise the efficiency of frequency utilization.

A CDMA (Code Division Multiple Access) scheme multiplies transmit data having a bit cycle $T_s$ by spreading codes $C_1$ to $C_N$ of chip frequency Tc using a multiplier 9, as shown in FIG. 14, modulates the result of multiplication and transmits the modulated signal. Owing to such multiplication, a $2/T_s$ narrow-band signal NM can be spread-spectrum modulated to a 2/Tc wideband signal DS and transmitted, as shown in FIG. 15. Here Ts/Tc is the spreading ratio and, in the illustrated example, is the code length N of the spreading code. In accordance with this CDMA transmission scheme, an advantage acquired is that an interference signal can be reduced to 1/N.

According to the principles of multicarrier CDMA, N-number of items of copy data are created from a single item of transmit data D, as shown in FIG. 16, the items of copy data are multiplied individually by respective ones of codes $C_1$ to $C_N$, which are spreading codes (orthogonal codes), using multipliers $9_1$ to $9_N$, respectively, and products $DC_1$ to $DC_N$ undergo multicarrier transmission by N-number of subcarriers of frequencies $f_1$ to $f_N$ illustrated in (a) of FIG. 17. The foregoing relates to a case where a single item of symbol data undergoes multicarrier transmission. In actuality, however, as will be described later, transmit data is converted to parallel data of M symbols, the M-number of symbols are subjected to the processing shown in FIG. 16, and all results of M×N multiplications undergo multicarrier transmission using M×N subcarriers of frequencies $f_1$ to $fN_M$. Further, orthogonal frequency/code division multiple access can be achieved by using subcarriers having the frequency placement shown in (b) of FIG. 17.

FIG. 18 is a diagram illustrating the structure on the transmitting side of MC-CDMA (the structure of a base station). A data modulator 11 modulates transmit data of a user and converts it to a complex baseband signal (symbol) having an in-phase component and a quadrature component. A time multiplexer 12 time-multiplexes the pilot of the complex symbol to the front of the transmit data. A serial/parallel converter 13 converts the input data to parallel data of M symbols, and each symbol is input to a spreader 14 upon being branched into N paths. The spreader 14 has M-number of multipliers $14_1$ to $14_M$. The multipliers $14_1$ to $14_M$ multiply the branched symbols individually by codes $C_1, C_2, \ldots, C_N$ constituting orthogonal codes and output the resulting signals. As a result, subcarrier signals $S_1$ to $S_{MN}$ for multicarrier transmission by N×M subcarriers are output from the spreader 14. That is, the spreader 14 multiplies the symbols of every parallel sequence by the orthogonal codes, thereby performing spreading in the frequency direction. Though codes (Walsh codes) $C_1, C_2, \ldots, C_N$ that differ for every user are indicated as the orthogonal codes used in spreading, in actuality channel identification codes (Gold codes) $G_1$ to $G_{MN}$ are further multiplied by the signals $S_1$ to $S_{MN}$.

A code multiplexer 15 code-multiplexes the subcarrier signals generated as set forth above and the subcarriers of other users generated through a similar method. That is, for every subcarrier, the code multiplexer 15 combines the subcarrier signals of a plurality of users conforming to the subcarriers and outputs the result. A frequency interleaver 16 rearranges the code-multiplexed subcarriers by frequency interleaving, thereby distributing the subcarrier signals along the frequency axis, in order to obtain frequency-diversity gain. An IFFT (Inverse Fast Fourier Transform) unit 17 applies an IFT (Inverse Fourier Transform) to the subcarrier signals that enter in parallel, thereby effecting a conversion to an OFDM signal (a real-part signal and an imaginary-part signal) on the time axis. A guard-interval insertion unit 18 inserts a guard interval into the OFDM signal, an orthogonal modulator applies orthogonal modulation to the OFDM signal into which the guard interval has been inserted, and a radio transmitter 20 up-converts the signal to a radio frequency, applies high-frequency amplification and transmits the resulting signal from an antenna.

The total number of subcarriers is (spreading ratio N)× (number M of parallel sequences). Further, since fading that differs from subcarrier to subcarrier is sustained on the propagation path, a pilot is time-multiplexed onto all subcarriers and it is so arranged that fading compensation can be performed subcarrier by subcarrier on the receiving side. The time-multiplexed pilot is a common pilot that all users employ in channel estimation.

FIG. 19 is a diagram useful in describing a serial-to-parallel conversion. Here a common pilot P has been time-multiplexed to the front of one frame of transmit data. It should be noted that the common pilot P can be dispersed within a frame, as will be described later. If the common pilot per frame is, e.g., 4×M symbols and the transmit data is 28×M symbols, then M symbols of the pilot will be output from the serial/parallel converter 13 as parallel data the first four times, and thereafter M symbols of the transmit data will be output from the serial/parallel converter 13 as parallel data 28 times. As a result, in the period of one frame the pilot can be time-multiplexed into all subcarriers and transmitted. By using this pilot on the receiving side, channel estimation is performed on a per-subcarrier basis and channel compensation (fading compensation) becomes possible.

FIG. 20 is a diagram useful in describing insertion of a guard interval. If an IFFT output signal conforming to M×N subcarrier samples (=1 OFDM symbol) is taken as one unit, then guard-interval insertion signifies copying the tail-end portion of this symbol to the leading-end portion thereof. Inserting a guard interval GI makes it possible to eliminate the effects of inter-symbol interference ascribable to multipath.

FIG. 21 is a diagram showing structure on the receiving side of MC-CDMA. A radio receiver 21 subjects a received multicarrier signal to frequency conversion processing, and an orthogonal demodulator subjects the receive signal to orthogonal demodulation processing. A timing-synchronization/guard-interval removal unit 23 establishes receive-signal timing synchronization, removes the guard interval GI from the receive signal and inputs the result to an FFT (Fast Fourier Transform) unit 24. The FFT unit 24 executes FFT processing and converts the signal in the time domain to N×M-number of subcarrier signals (subcarrier samples) at an FFT window timing. A frequency deinterleaver 25 rearranges the subcarrier signals in an order opposite that on the transmitting side and outputs the signals in the order of the subcarrier frequencies.

After deinterleaving is carried out, a fading compensator 26 performs channel estimation on a per-subcarrier basis using the pilot time-multiplexed on the transmitting side and applies fading compensation. In the Figure, a channel estimation unit $26a_1$ is illustrated only in regard to one subcarrier. However, such a channel estimation unit is provided for every subcarrier. That is, the channel estimation unit $26a_1$ estimates the influence exp(jφ) of fading on phase using the pilot signal, and a multiplier $26b_1$ multiplies the subcarrier signal of the transmit symbol by exp(−jφ) to compensate for fading.

A despreader 27 has M-number of multipliers $27_1$ to $27_M$. The multiplier $27_1$ multiplies N-number of subcarriers individually by codes $C_1, C_2, \ldots, C_N$ constituting orthogonal codes (Walsh codes) assigned to users and outputs the results. The other multipliers also execute similar processing. As a result, the fading-compensated signals are despread by spreading codes assigned to each of the users, and signals of desired users are extracted from the code-multiplexed signals by despreading. It should be noted that in actuality, the channel identification codes (Gold codes) are multiplied before the Walsh codes.

Combiners $28_1$ to $28_M$ each add the N-number of results of multiplication that are output from respective ones of the multipliers $27_1$ to $27_M$, thereby creating parallel data comprising M-number of symbols. A parallel/serial converter 29 converts this parallel data to serial data, and a data demodulator 30 demodulates the transmit data.

FIG. 22 is a diagram for describing the operation of the channel estimation unit. Here four pilot symbols (four OFDM pilot symbols) are multiplexed upon being dispersed within one frame composed of 32 OFDM symbols. Since one pilot symbol is composed of subcarrier samples equivalent to the number of subcarriers (M×N, e.g., 1024), subcarrier-by-subcarrier channel (amplitude characteristic and phase characteristic) estimation becomes possible by monitoring the FFT output at the pilot-receive timing on the receiving side. More specifically, to perform channel estimation, four sets of eight subcarrier samples in the frequency direction are gathered in the time direction to construct one group by a total of 32 subcarrier samples, as indicated at PG1 in FIG. 22, the average value of FFT outputs in this group is adopted as the channel value (amplitude and phase of the receive pilot signal) of the subcarrier at the center, and this channel value is compared with the known channel value (known amplitude and phase of the pilot signal), whereby the channel of this subcarrier is estimated. To obtain the channel estimation value of the next subcarrier, four sets of eight subcarrier samples shifted by one subcarrier in the frequency direction are gathered in the time direction to construct one group by a total of 32 subcarrier samples, as indicated at PG2, and the channel estimation value is similarly calculated using the average value in the group PG2. The reason for obtaining the channel value by averaging as set forth above is that since each symbol contains noise, the effects of such noise are eliminated by averaging to improve the S/N ratio. If subcarriers are very close in terms of frequency, the channel values are almost the same and therefore no problems are caused by averaging.

FIG. 23 is a diagram useful in describing FFT window timing in case of two paths (two waves), where A represents a direct wave and B a delayed wave (reflected wave). If the FFT window is decided to have a width Wa of one OFDM measured from the leading end of an OFDM symbol D1 of the direct wave, then the OFDM symbol D1 of the direct wave will merely overlap a guard interval GI1 and part of the D1 symbol of the delayed wave in the FFT window width Wa. As a result, there are no effects from inter-symbol interference (ISI) ascribable to multipath delayed waves. However, if the FFT window is decided to have a width Wb of one OFDM measured from the leading end of an OFDM symbol D1 of the delayed wave, then there will be overlap between part of the D1 symbol of the delayed wave and a guard interval GI2 of a D2 symbol of the direct wave, as a result of which the effects of inter-symbol interference ISI are sustained. The FFT window should be decided in such a manner that there will be no effects from inter-symbol interference ISI. If the FFT window is decided so as to be Wa in FIG. 23, inter-symbol interference ISI will not be received unless the largest delayed wave is delayed in excess of the duration of the guard interval GI.

If a Fourier transform of function $f(t)$ is expressed by $F[f(t)]$, a Fourier transform of a time-delay function $f(t-t_0)$ will be $\exp(-2\pi j f t_0) F[f(t)]$. If we consider that $\exp(-2\pi j f t_0) = \cos 2\pi f t_0 - j \sin 2\pi f t_0$ holds, then the Fourier transform of the time-delay function $f(t-t_0)$ will rotate in accordance with a change in frequency. For example, a Fourier transform of an impulse $\delta(t)$ at time $t=0$ is 1 (=a constant) at any frequency, as shown in (a) of FIG. 24. However, a Fourier transform of $\delta(t-t_0)$ rotates in accordance with frequency in such a manner that the projection upon the I-jQ complex plane describes a unit circle, as shown in (b) of FIG. 24.

Thus, in a case where the receive power of a direct wave is high and that of a delayed wave is low, as shown in FIG. 25, the average value of the FFT becomes large and the amplitude of rotation small if the FFT operation is preformed upon deciding the FFT window using the OFDM symbol of the direct wave as a reference. Thus, since the fluctuation portion is small, a correct channel value can be obtained and the channel estimated correctly by averaging 32 subcarrier samples. In addition, there is no inter-symbol interference ISI.

However, in a case where the receive power of a direct wave is low and that of a delayed wave is high, as shown in FIG. 26, the average value of the FFT becomes small and the amplitude of rotation large if the FFT operation is preformed upon deciding the FFT window using the OFDM symbol of the direct wave as a reference. Thus, when the fluctuation portion becomes large, the channel value obtained by averaging 32 subcarrier samples includes an error and the channel cannot be estimated correctly.

SUMMARY OF THE INVENTION

An object of the present invention is to so arrange it that channel estimation can be performed correctly even in a case where the receive power of a delayed wave is greater than that of a direct wave.

Another object of the present invention is to so arrange it that there will be no inter-symbol interference ISI and so that channel estimation can be performed correctly even in a case where the receive power of a delayed wave is greater than that of a direct wave.

In an OFDM receiving apparatus for receiving a signal that has undergone Orthogonal Frequency Division Multiplexing (OFDM) and applying FFT processing to the receive signal to demodulate transmit data, an OFDM symbol comprising a fixed number of items of sample data is extracted from a receive signal, a position at which FFT processing of the OFDM symbol starts is shifted based upon the state of multipath and FFT processing is executed from the position to which the shift has been made. The state of multipath can be acquired from a delay profile. Specifically, a channel estimation value is obtained from result of FFT processing of known data (a reference signal) contained in the receive signal, a multipath delay profile is obtained by applying IFFT processing to this channel estimation value, and the state of multipath is acquired based upon the delay profile. For example, a path of maximum power is obtained from the delay profile of this multipath, and the position at which the FFT processing begins is decided based upon the position of this path.

By virtue of the foregoing, it can be so arranged that there will be no effects from inter-symbol interference ISI and so that channel estimation can be performed correctly even in a case where the receive power of a delayed wave is greater than that of a direct wave.

Further, the delay profile of each path of multipath is compared with a set level and, if the delay profile is less than the set level, the position at which FFT processing begins is decided upon adopting 0 as the delay profile. If this arrangement is adopted, noise components can be eliminated and highly precise channel estimation can be performed.

Further, the rightful position at which FFT processing begins is calculated by delaying the delay profile of each path of multipath by a predetermined period of time, obtaining a provisional FFT-processing starting position based upon the delay profile delayed by the predetermined period of time, and advancing the provisional FFT-processing starting position by the predetermined period of time. If this arrangement is adopted, the FFT-processing starting position can be decided accurately even if the path is one on which a wave arrives prior to the FFT window timing.

BRIEF DESCRIPTION OF THE DRAWINGS

FIG. 1 is a diagram useful in describing the principles of the present invention;

FIG. 4 is a diagram useful in describing a delay profile;

FIG. 6 is a diagram useful in describing the operation of the FFT window timing recovery unit;

FIG. 10 is a diagram useful in describing the reason why a shift operation is necessary;

DESCRIPTION OF THE PREFERRED EMBODIMENTS

(A) Principles of the Present Invention

In a case where receive power of a direct wave A is low and that of a delayed wave B high, there will be no inter-symbol interference ISI if an FFT window Wa is decided using an OFDM symbol D0 of the direct wave as a reference, as shown in (a) of FIG. 1. However, the average value of the FFT becomes small, the amplitude of rotation becomes large and channel estimation can no longer be performed correctly, as shown in (b) of FIG. 1. On the other hand, if an FFT window Wb is decided using an OFDM symbol D0 of the delayed wave as a reference, then the average value of the FFT becomes large and the amplitude of rotation becomes small as shown in (c) of FIG. 1. Inter-symbol interference ISI, however, is produced.

Accordingly, in the present invention, one OFDM signal is accepted from an input data sequence using the leading end (time Ta) of the OFDM symbol D0 of the direct wave as a reference, and the leading end (time Tb) of the OFDM symbol D0 of the delayed wave is adopted as the FFT-processing starting position. More specifically, FFT processing is executed upon shifting the data between times Ta, Tb to a later time. That is, as shown in (d) of FIG. 1, a portion D01 of the direct wave and a portion GI0' of the delayed wave between Ta and Tb are shifted to the tail end and the one OFDM symbol after the shift thereof is subjected to FFT processing from its foremost end. If the above arrangement is adopted, since the continuity of the data is maintained, inter-symbol interference ISI can be eliminated, the average value of the FFT can be enlarged and the amplitude of rotation reduced, thereby making it possible to perform channel estimation correctly.

The foregoing relates to a case where the receive power of the delayed wave is assumed to be high. However, there are also instances where the receive power of the direct wave is high. This means that the above-mentioned time Tb is the time of the leading end of the OFDM symbol of the wave (direct wave or delayed wave) for which the receive power is largest. This leading-end time can be decided by a delay profile obtained by applying an IFFT to the channel estimation value.

Further, in order to perform FFT processing upon performing the shift as described above, one OFDM symbol is accepted from the input data sequence and stored in a buffer at time Ta, the data is read out of the buffer in order from a storage location conforming to time Tb and the read data is input to an FFT processing unit. If the data is read out to the end of the buffer, then the data is subsequently read out from the beginning of the buffer to the position conforming to time Tb and the data is input to the FFT processing unit, whereby FFT processing is executed.

(B) OFDM Receiving Apparatus

(a) Overall Structure

Figure 2:
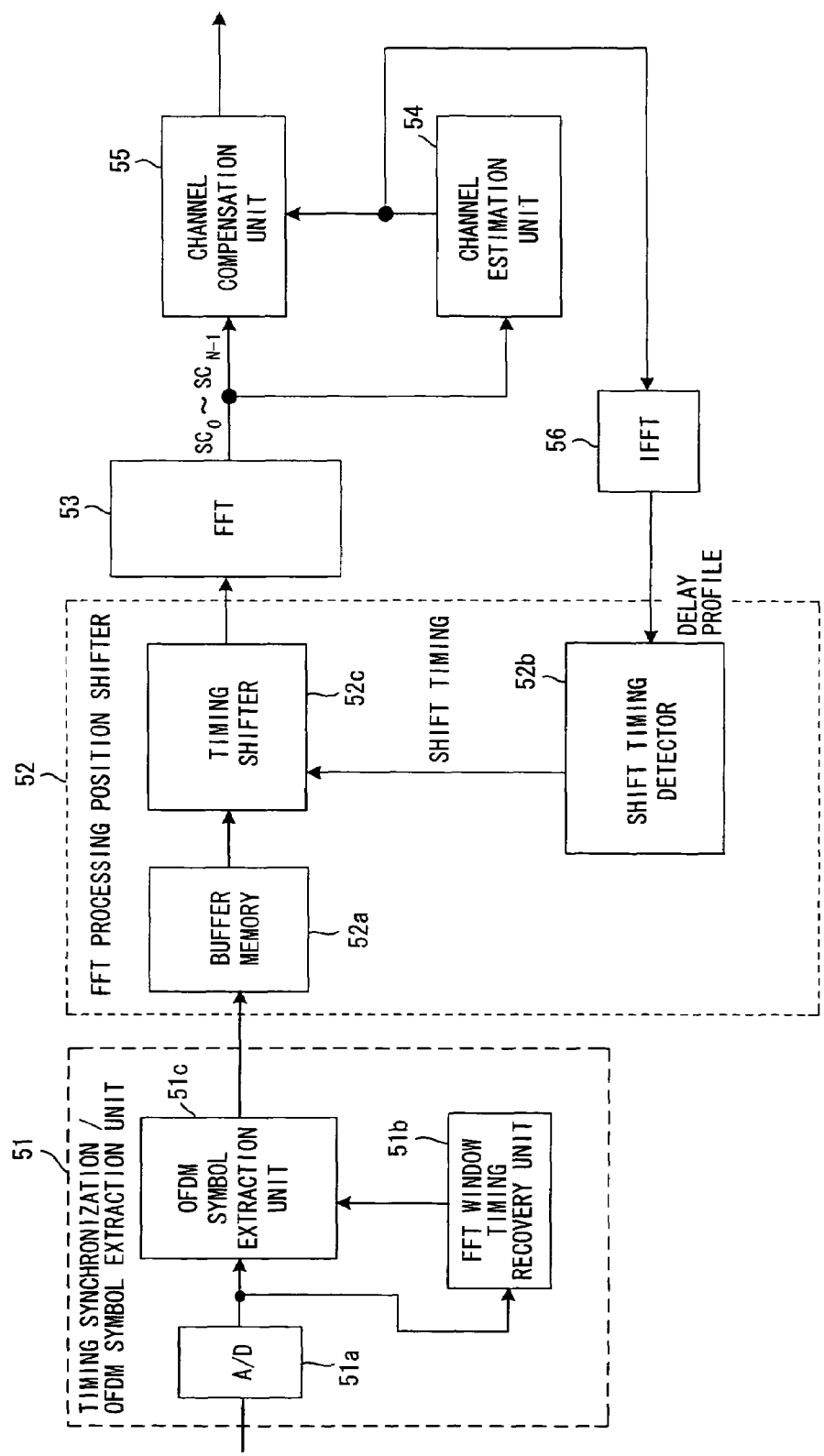
FIG. 2 is a block diagram of the main part of an OFDM receiving apparatus according to the present invention.
Figure 3:
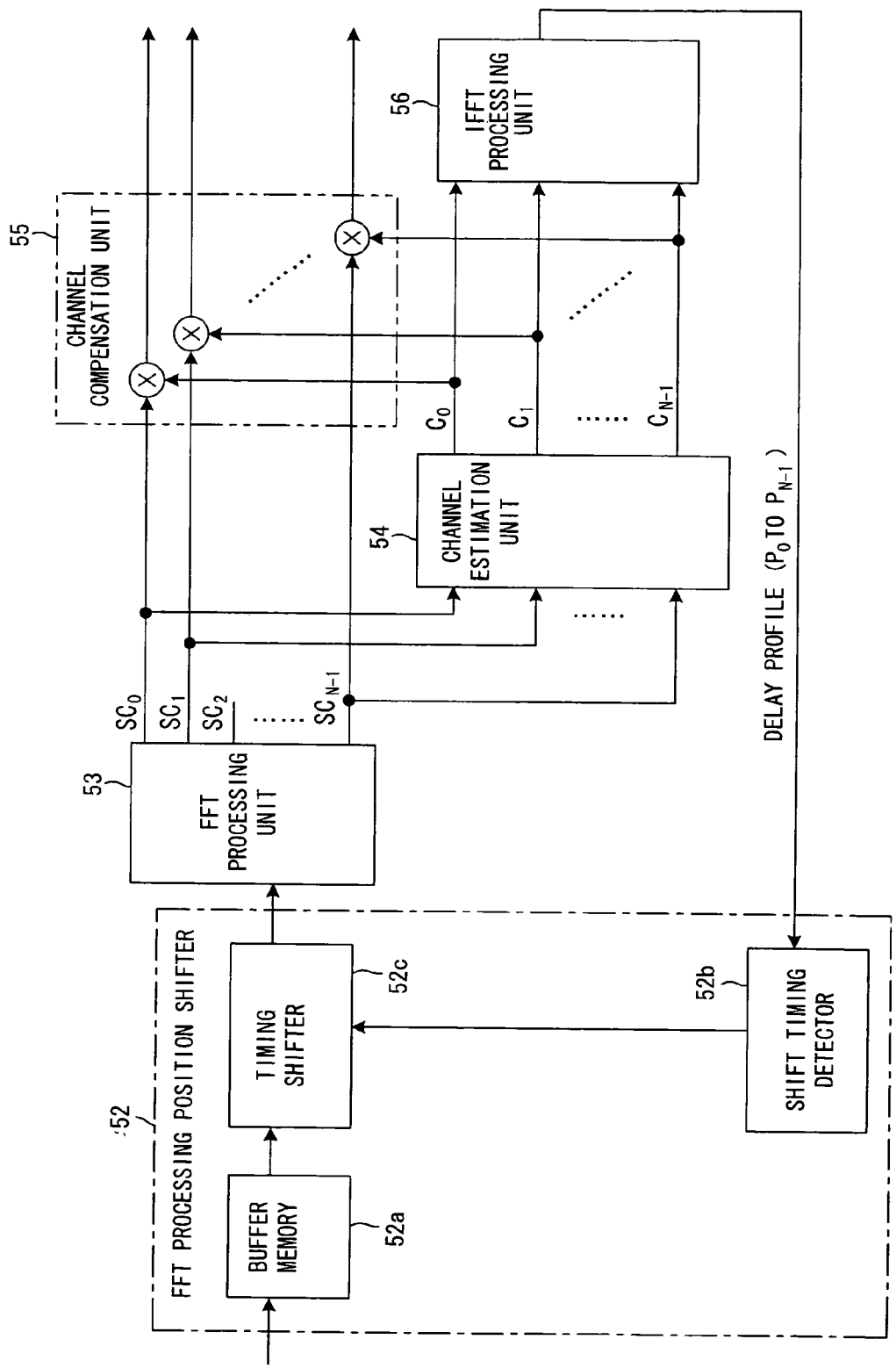
FIG. 3 is a diagram showing the details of a portion of the OFDM receiving apparatus.
Figure 21:
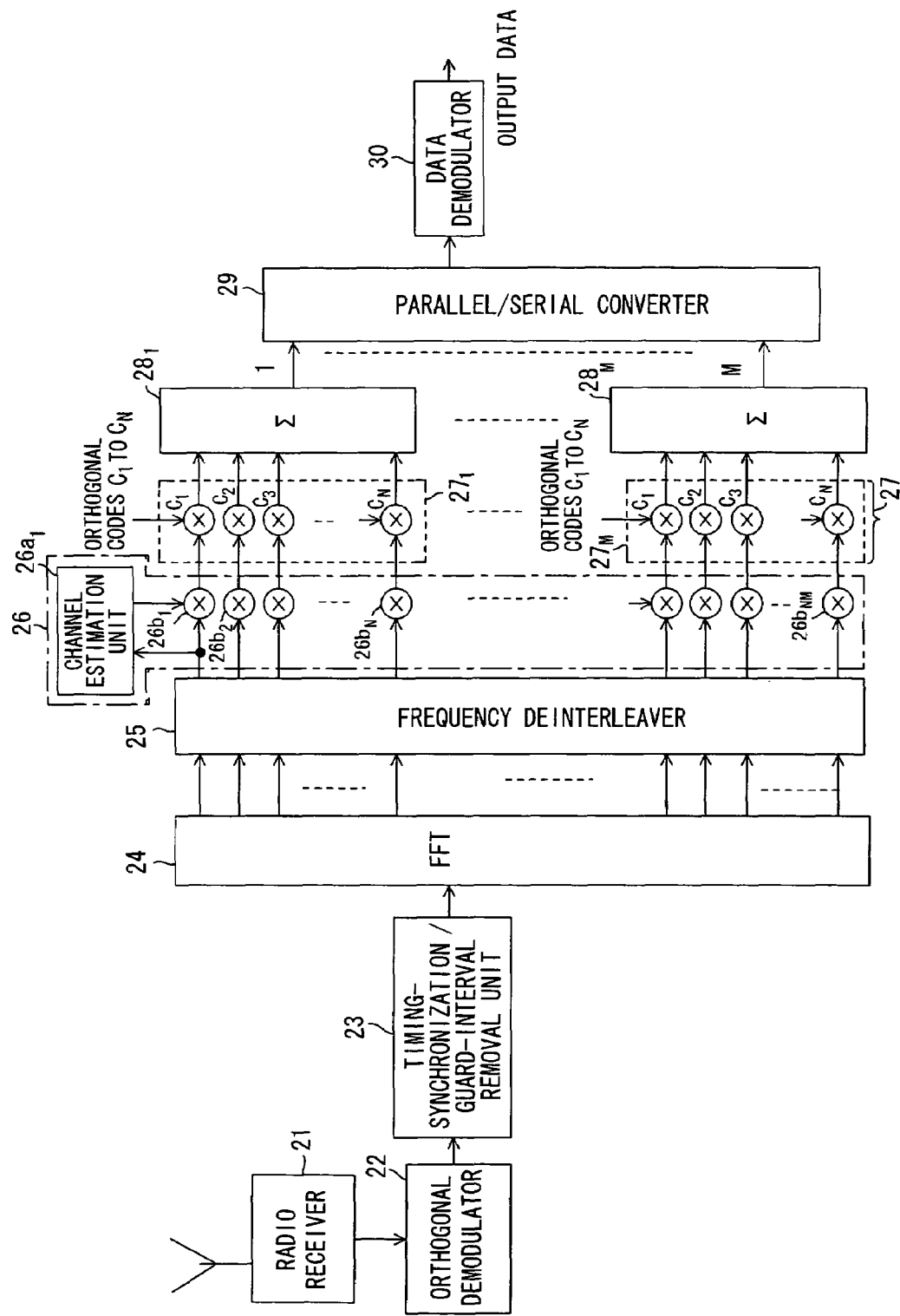
FIG. 21 is a block diagram of a receiving side in MC-CDMA according to the prior art.

FIG. 2 is a block diagram of the main part of an OFDM receiving apparatus according to the present invention, and FIG. 3 is a diagram showing the details of a portion of the OFDM receiving apparatus. A timing synchronization/OFDM symbol extraction unit 51 detects the leading-end timing Ta (see FIG. 1) of the OFDM symbol of a direct wave, extracts one OFDM symbol, which does not include a guard interval, based upon the above timing, and outputs the OFDM symbol. The timing synchronization/OFDM symbol extraction unit 51 is a portion of the apparatus that corresponds to the timing-synchronization/guard-interval extraction unit 23 in FIG. 21.

Based upon a delay profile described later, an FFT processing position shifter 52 decides the delay time (Tb-Ta) from a direct wave for which the receive power is maximum (actually delay time from the timing at which the FFT window starts), shifts, by (Tb-Ta), the position at which FFT processing starts with regard to the OFDM symbol extracted by the timing synchronization/OFDM symbol extraction unit 51, and shifts the (Tb-Ta) portion at the leading end to the tail end.

Figure 22:
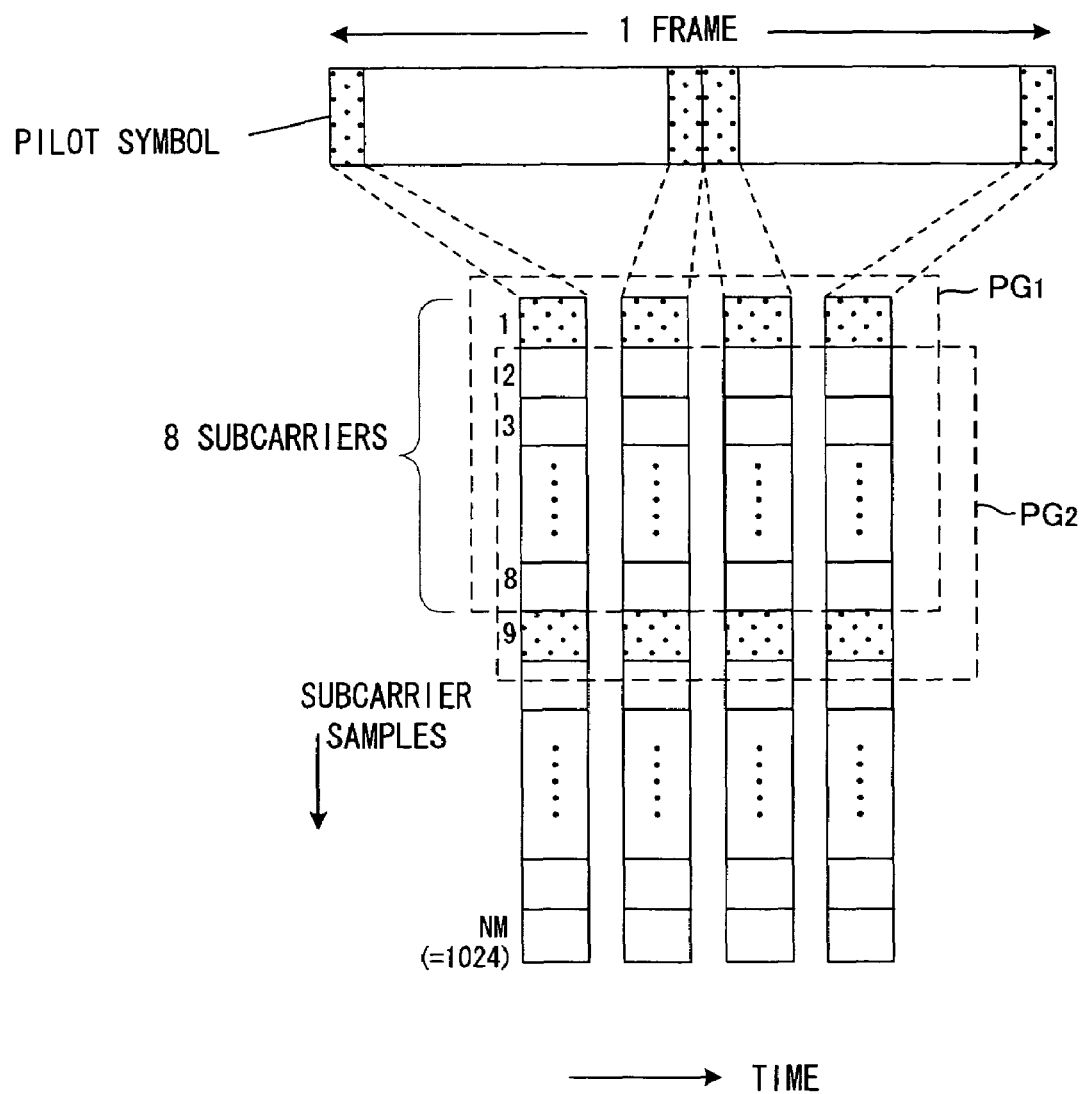
FIG. 22 is a diagram useful in describing the operation of a channel estimation unit.
Figure 23:
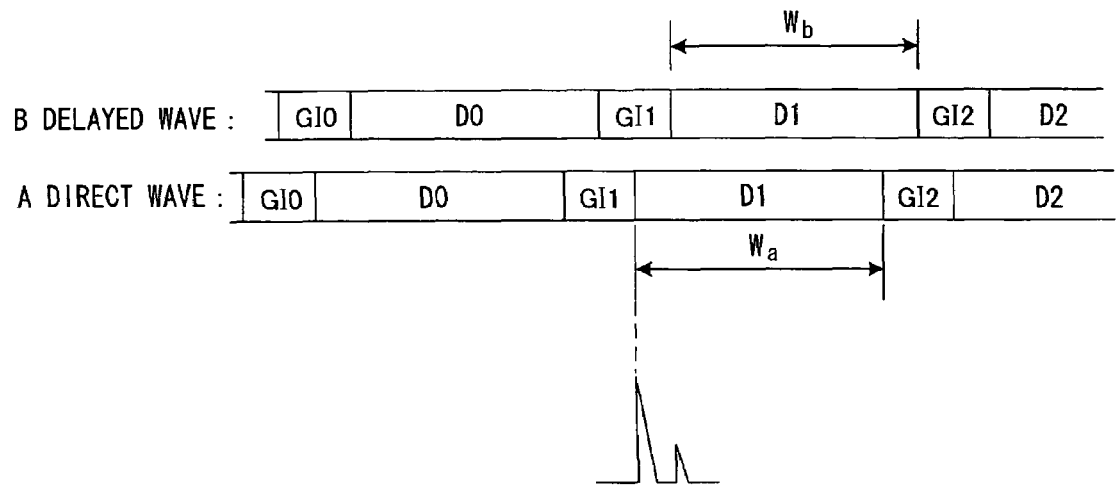
FIG. 23 is a diagram useful in describing FFT window timing in the case of two paths (two waves)
Figure 24:
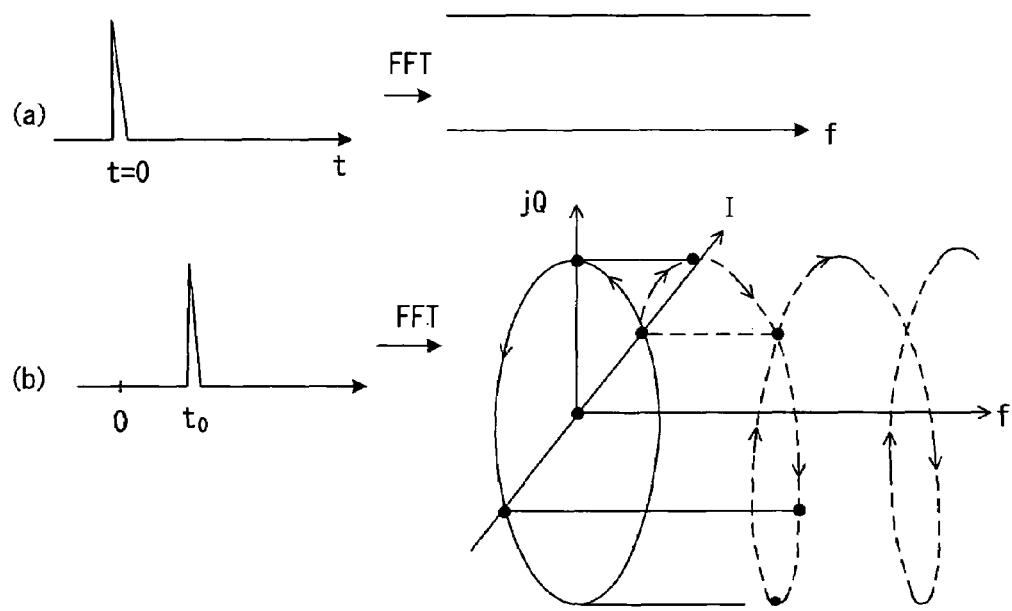
FIG. 24 is a diagram useful in describing a Fourier transform.
Figure 25:
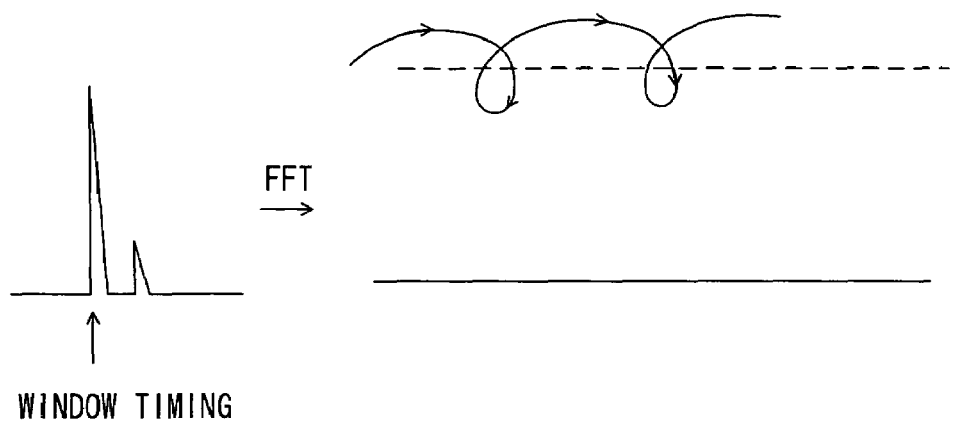
FIG. 25 is a diagram useful in describing an FFT in a case where receive power of a direct wave is high and that of a delayed wave low.
Figure 26:
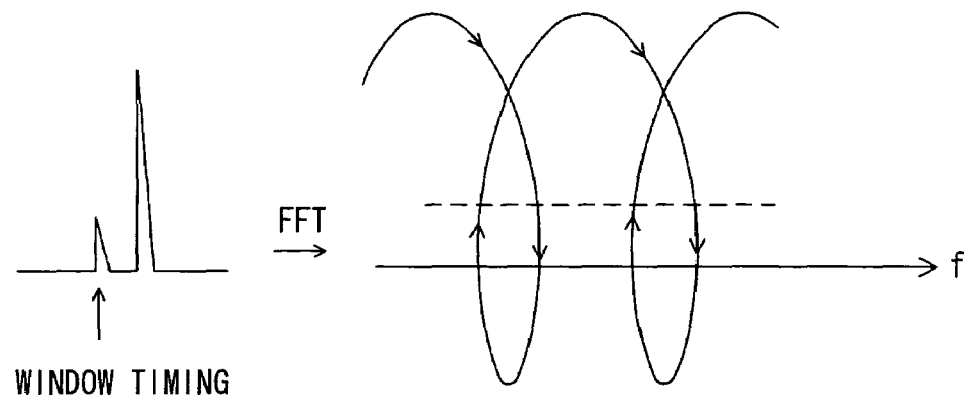
FIG. 26 is a diagram useful in describing an FFT in a case where receive power of a direct wave is low and that of a delayed wave high.

An FFT processing unit 53 applies FFT processing to the OFDM symbol data (time-domain signal) that enters from the FFT processing position shifter 52 and effects a conversion to signals $SC_0$ to $SC_{N-1}$ of N-number of subcarriers. A channel estimation unit 54 estimates the channel on a per-subcarrier basis by the method described in connection with FIG. 22 and outputs channel estimation values $C_0$ to $C_{N-1}$. Multipliers $55_0$ to $55_{N-1}$ of a channel compensation unit 55 multiply the N-number of subcarrier signals $SC_0$ to $SC_{N-1}$, which are output from the FFT processing unit 53, by channel estimation values $C_0$ to $C_{N-1}$, respectively, of each of the subcarriers, thereby performing channel compensation (fading compensation), and input N-number of channel-compensated subcarrier signals to a despreader of a succeeding stage, which is not shown.

An IFFT processing unit 56 applies IFT (Inverse Fourier Transform) processing to the channel estimation values $C_0$ to $C_{N-1}$ of the number N of subcarriers output from the channel estimation unit 54 and outputs a delay profile comprising N-number of samples per symbol, as shown in (a) of FIG. 4. Each sample indicates the strength of each wave of direct and delayed waves. Each sample value of the delay profile that exceeds a maximum delay time M from the FFT window position (=0) becomes a value that is below a set value. It should be noted that sample values conforming to a wave that arrives before the FFT window position (=0) appear at the tail end of the delay profile, as indicated in (b) of FIG. 4.

(b) Timing Synchronization/OFDM Symbol Extraction Unit

In the timing synchronization/OFDM symbol extraction unit 51, an AD converter 51a converts a baseband signal (I and Q components of a complex number), which is output from an orthogonal demodulator (not shown), to digital data, and an FFT window timing recovery unit 51b detects the leading-end position of the guard interval of a direct wave by a correlation operation and inputs the position to an OFDM symbol extraction unit 51c. The latter extracts one item of OFDM symbol data from the input data sequence at a timing Ta at which a time equivalent to the guard interval elapses from the leading-end position of the guard interval, and inputs this data to the FFT processing position shifter 52.

Figure 5:
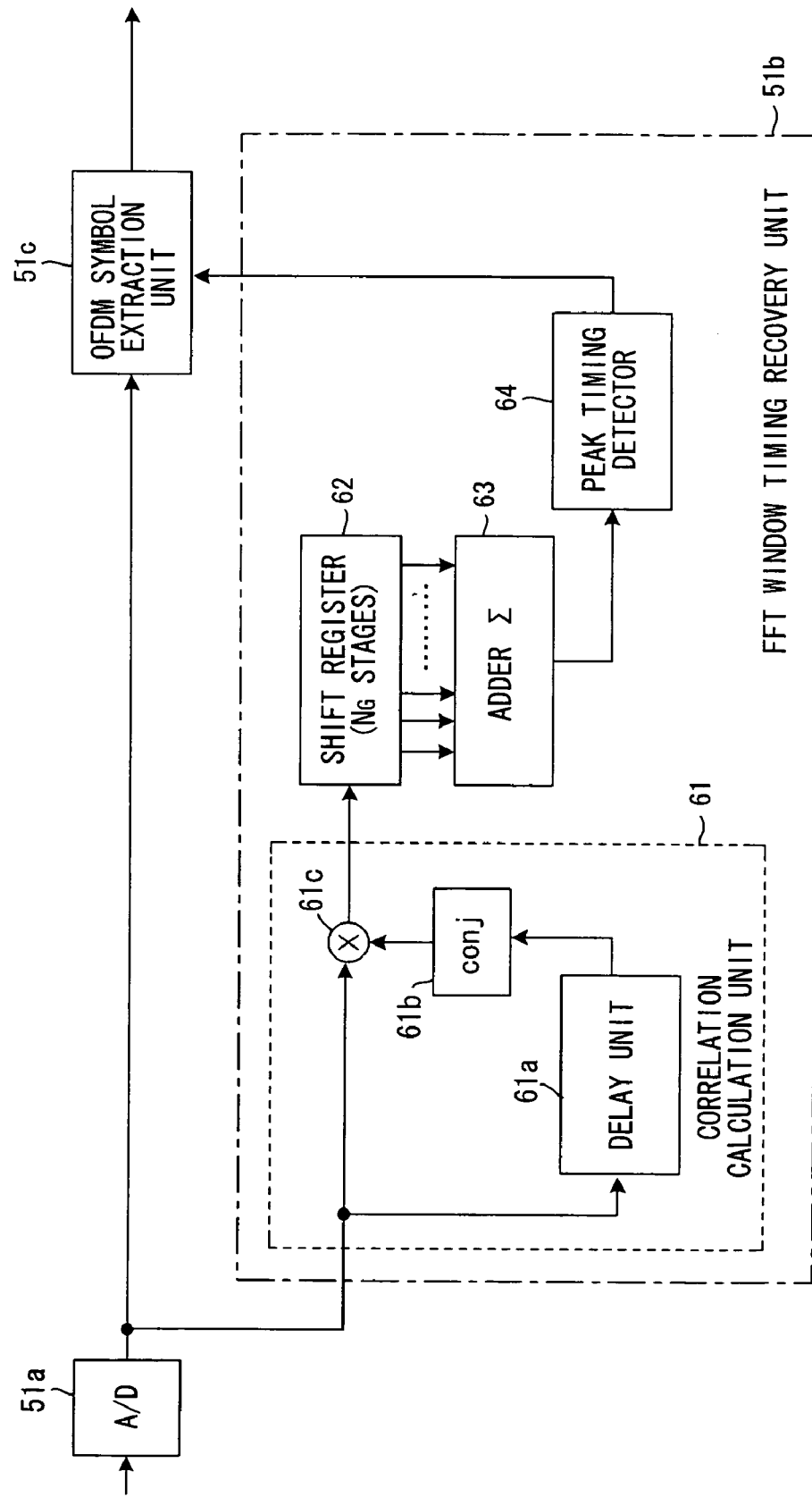
FIG. 5 is a block diagram of an FFT window timing recovery unit.

FIG. 5 is a block diagram of the FFT window timing recovery unit 51b, and FIG. 6 is a diagram useful in describing the operation of the FFT window timing recovery unit. A guard interval GI is created by copying, to the leading end of one OFDM symbol of N-number of samples, the tail-end portion composed of $N_G$-number of samples, as shown in (a) of FIG. 6. By calculating the correlation between the receive signal one OFDM symbol earlier and the present receive signal, therefore, the correlation value will take on the maximum value at the portion of the guard interval GI, as shown in (b) of FIG. 6, and the FFT window timing can be detected from the time $t_0$ at which the correlation value is maximized. That is, a delay element 61a of a correlation calculation unit 61 delays the receive signal by one OFDM symbol (N-number of samples), a complex-conjugate calculation unit 61b calculates the complex conjugate of the receive signal delayed by the delay element 61a, and a multiplier 61c multiplies the present receive signal by the complex conjugate of the receive signal, which is one OFDM symbol earlier, output from the complex-conjugate calculation unit 61b, and outputs the result of multiplication (namely the correlation value).

A shift register 62, which has a length equivalent to the number $N_G$ of samples of the guard interval, stores the latest $N_0$-number of results of multiplication (correlation values), and an adder 63 adds the $N_G$-number of correlation values and outputs the sum. Ideally, the receive signal prevailing one OFDM symbol earlier and the present receive signal (I+jQ) are identical in the time period of the guard interval, and therefore $I^2+Q^2$ is obtained from the multiplier 61c in the period of the guard interval. Accordingly, as the number of correlation values in the duration of the guard interval stored in the shift register 62 increases, the sum thereof gradually increases, as shown in (b) of FIG. 6. When all $N_G$-number of the correlation values in the period of the guard interval have been stored in the shift register 62, the sum takes on the maximum value. The number of correlation values in the guard interval stored in the shift register 62 thenceforth diminishes and the sum gradually decreases. By detecting the timing at which the sum peaks, therefore, the timing of the leading end of the guard interval GI of the direct wave can be detected. In a multipath environment, however, the value of the sum from the adder 63 becomes the sum CR of the sum CR1 (the one-dot chain line) of the direct wave and the sum CR2 (the dashed line) of the delayed wave, as shown in (c) of FIG. 6, and the position of the peak shifts from the peak position of the direct wave by Δt.

A peak timing detector 64 detects the peak position of the sum and inputs this peak position $t_0$ to the OFDM symbol extraction unit 51c as the position of the leading end of the guard interval.

The OFDM symbol extraction unit 51c extracts the data of the one OFDM symbol from the input data sequence following elapse of the guard-interval time period from the leading-end position of the guard interval and inputs this data to the FFT processing position shifter 52.

(c) FFT Processing Position Shifter

A buffer memory 52a stores N-number of samples of one OFDM symbol that enter from the OFDM symbol extraction unit 51c. From the delay profile that enters from the IFFT processing unit 56, a shift timing detector 52b obtains, as a shift quantity S (see FIG. 4) calculated in terms of number of samples, the delay time from the direct wave of the wave for which the receive power is maximized (namely from the FFT window position). A timing shifter 52c shifts, by the S-number of samples, the position at which FFT processing starts to be applied to the OFDM symbol extracted by the timing synchronization/OFDM symbol extraction unit 51, and shifts S-number of samples of the leading end of the OFDM symbol to the tail end. More specifically, the timing shifter 52c obtains an address of jth read-out data from the buffer memory 52a in accordance with the following equation:

$$i=(j+S) \bmod N \quad (1)$$

reads the data out of the buffer memory from this address i thereof and inputs the data to the FFT processing unit 53. It should be noted that N-number of items of complex data $x_i$ of the OFDM symbol length are accumulated in the buffer memory 52a, that i=0, ..., (N−1) holds and that S=shift quantity. Further, mod represents a modulus operation and corresponds to the remainder obtained when (j+S) is divided by N.

In other words, when data is read out of the buffer memory 52a, the timing shifter 52c reads out sample data $x_i$ at address i, which has been calculated in accordance with Equation (1), successively while changing j from 0 to (N−1). As a result, sample data that has been shifted by S-number of samples can be input to the FFT processing unit 53 and S-number of samples of data at the leading end can be shifted to the tail end.

(d) Operation

In view of the foregoing, the timing synchronization/OFDM symbol extraction unit 51 extracts one OFDM symbol, which is composed of N-number of samples, from the input data sequence using the FFT window timing, which ideally is the leading-end time of the OFDM symbol of the direct wave, and inputs the symbol to the FFT processing position shifter 52. The occurrence of inter-symbol interference ISI can be prevented by performing FFT processing using this OFDM symbol.

The FFT processing position shifter 52 stores the entered N sample's worth of data representing one OFDM symbol in the buffer memory 52a and, on the basis of the delay profile that enters from the IFFT processing unit 56, finds the shift quantity S, which is obtained by expressing the delay time from the FFT window timing to the wave of maximum receive power in terms of number of samples, reads out the sample data successively from address i of buffer memory 52a indicated by Equation (1) and inputs the data to the FFT processing unit 53. The latter applies FFT processing to the OFDM symbol data, which has been shifted by S-number of samples, that enters from the FFT processing position shifter 52 and outputs signals $SC_0$ to $SC_{N-1}$ of the N-number of subcarriers. The amount of rotational fluctuation of the FFT can be reduced by applying the shift of S-number of samples.

The channel estimation unit 54 estimates a channel subcarrier by subcarrier and the channel compensation unit 55 multiplies the N-number of subcarrier signals $SC_0$ to $SC_{N-1}$, which are output from the FFT processing unit 53, by channel estimation values $C_0$ to $C_{N-1}$ of each of the subcarriers, thereby performing channel compensation. Further, the IFFT processing unit 56 applies IFFT processing to the channel estimation values $C_0$ to $C_{N-1}$ of the N-number of subcarriers that are output from the channel estimation unit 54 and outputs the delay profile.

The above operation is thenceforth performed for every OFDM symbol, whereby the occurrence of inter-symbol interference ISI can be prevented, the amplitude of the rotational fluctuating portion of the FFT output can be reduced and channels can be estimated accurately.

(C) Embodiments of Shift Timing Detector

Figure 7:
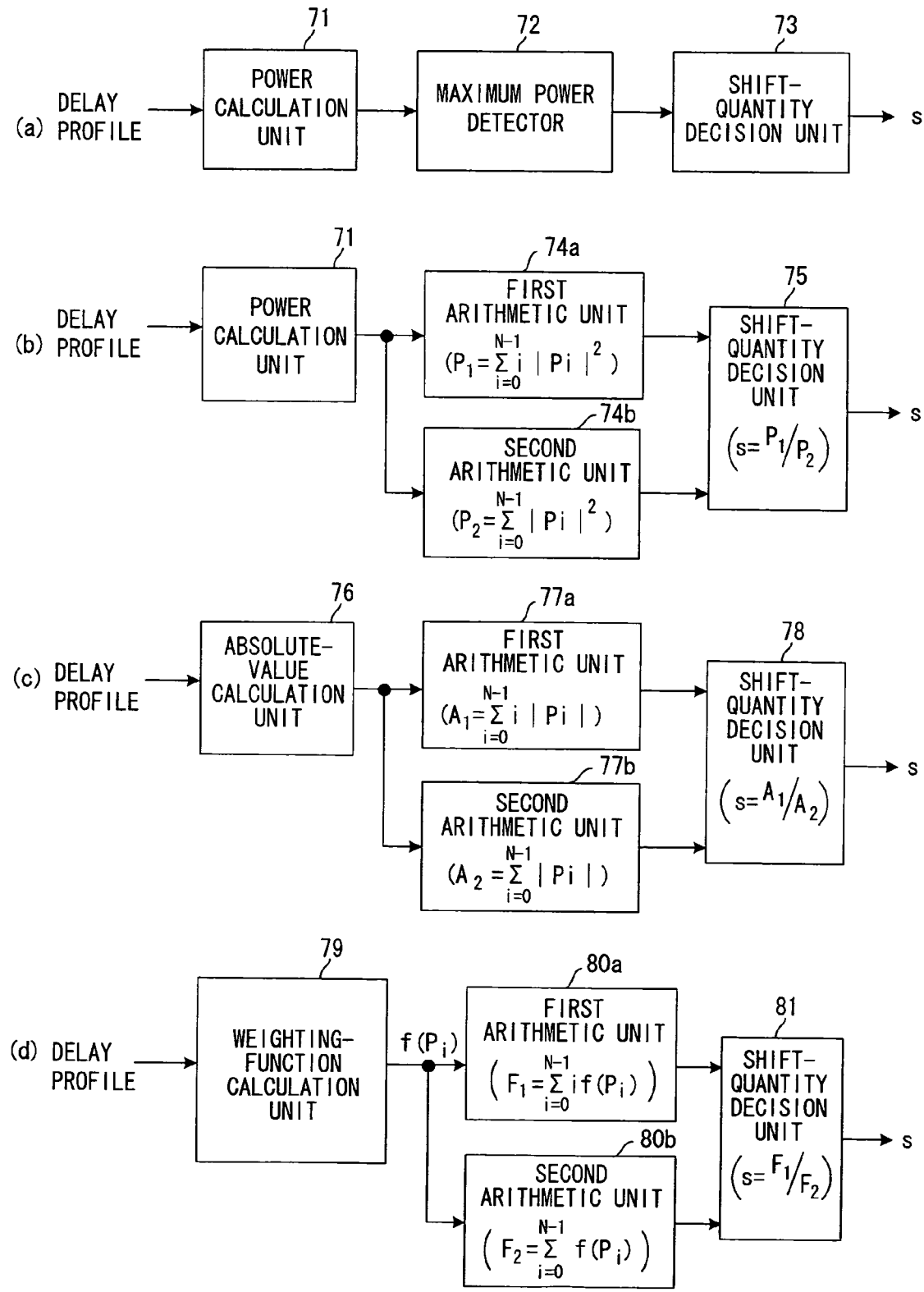
FIG. 7 shows various embodiments of a shift timing detector in an FFT processing position shifting unit.

FIG. 7 is a diagram useful in describing various embodiments of the shift timing detector 52b in the FFT processing position shifter 52. In the description that follows, it will be assumed that s represents an amount of shift to be obtained, N the number of subcarriers, $c_i$ the channel estimation value (a complex numerical value) of an ith subcarrier, and $p_i$ a delay profile (a complex numerical value) obtained by subjecting the channel estimation value $c_i$ to IFFT, and that i=0, . . . , (N−1) holds.

(a) Calculation Method Based Upon Maximum Power (a) of FIG. 7 is an embodiment in which the i that maximizes power $|p_i|^2$ is adopted as the shift quantity s.

A power calculation unit 71 calculates power $|p_i|^2$ of each sample value $p_i$ of the delay profile, a maximum power detector 72 detects maximum power $p_s$ from among the N-number of samples $p_i$ [i=0, . . . , (N−1)] of power, and a shift-quantity decision unit 73 decides a sample position s, which indicates the maximum power $p_s$, as the shift quantity. That is, the shift-quantity decision unit obtains a shift quantity s for which $|p_s| \geq |p_i|^2$ holds with respect to any $p_i$.

(b) Calculation Method Based Upon Power Weighting (b) of FIG. 7 is an embodiment in which i, which has been averaged and weighted by power $|p_i|^2$, is adopted as the shift quantity.

Here s, which is obtained in accordance with the following equation:

$$s = \frac{\sum_{i=0}^{N-1} i |p_i|^2}{\sum_{i=0}^{N-1} |p_i|^2} \quad (2)$$

is adopted as the shift quantity. More specifically, the power calculation unit 71 calculates power $|p_i|^2$ of each sample value $p_i$ of the delay profile, and a first arithmetic unit 74a calculates the numerator $P_1$ of Equation (2). The numerator $P_1$ is the total value of i weighted by power $|p_i|^2$. A second arithmetic unit 74b calculates the denominator $P_2$ of Equation (2), namely the sum total of power, and a shift-quantity decision unit 75 calculates the weighted average of i, which has been weighted by the power $|p_i|^2$, in accordance with $P_1/P_2$, and adopts the obtained average value as the shift quantity s. It should be noted that since s is a real number under these conditions, the shift-quantity decision unit 75 rounds s to a whole number by rounding down or rounding off.

(c) Calculation Method Based Upon Amplitude Weighting (c) of FIG. 7 is an embodiment in which i, which has been averaged and weighted by amplitude $|p_i|$, is adopted as the shift quantity.

Here s, which is obtained in accordance with the following equation:

$$s = \frac{\sum_{i=0}^{N-1} i |p_i|}{\sum_{i=0}^{N-1} |p_i|} \quad (3)$$

is adopted as the shift quantity. That is, an absolute-value calculation unit 76 calculates the amplitude $|p_i|$ of each sample value $p_i$ of the delay profile, and a first arithmetic unit 77a calculates the numerator $A_1$ of Equation (3). The numerator $A_1$ is the total value of i weighted by the amplitude $|p_i|$. A second arithmetic unit 77b calculates the denominator $A_2$ of Equation (3), namely the sum total of the amplitudes, and a shift-quantity decision unit 78 calculates the weighted average of i, which has been weighted by the amplitude $|p_i|$, in accordance with $A_1/A_2$, and adopts the obtained average value as the shift quantity s. It should be noted that since s is a real number under these conditions, the shift-quantity decision unit 78 rounds s to a whole number by rounding down or rounding off.

(d) Calculation Method Based Upon Weighted Average Using Weighting Function (d) of FIG. 7 is an embodiment in which i, which has been averaged and weighted by a weighting function $f(\ )$ in which $p_i$ is the argument, is adopted as the shift quantity.

Here s, which is obtained in accordance with the following equation:

$$s = \frac{\sum_{i=0}^{N-1} i f(p_i)}{\sum_{i=0}^{N-1} f(p_i)} \quad (4)$$

is adopted as the shift quantity. More specifically, a weighting-function calculation unit 79 calculates a weighting function value $f(p_i)$, and a first arithmetic unit 80a calculates the numerator $F_1$ of Equation (4). The numerator $F_1$ is the total value of i weighted by the weighting function value $f(p_i)$. A second arithmetic unit 80b calculates the denominator $F_2$ of Equation (4), namely the sum total of the weighting function values $f(p_i)$, and a shift-quantity decision unit 81 calculates the weighted average of i, which has been weighted by the weighting function value $f(p_i)$, in accordance with $F_1/F_2$, and adopts the obtained average value as the shift quantity s. It should be noted that since s is a real number under these conditions, the shift-quantity decision unit 81 rounds s to a whole number by rounding down or rounding off.

This generalized method becomes the same as the calculation method based upon maximum power in (a) above when the weighting function $f(\ )$ is decided as indicated by the following Equations (5), (6):

$$f(p_i)=1 \text{ (when i=s holds)} \quad (5)$$

$$f(p_1)=0 \text{ (when i≠s holds)} \quad (6)$$

Further, the generalized method becomes the same as the calculation method based upon power weighting in (b) above when the weighting function $f(\ )$ is decided as indicated by the following Equation (7):

$$f(p_i)=|p_i|^2 \quad (7)$$

Furthermore, the generalized method becomes the same as the calculation method based upon amplitude weighting in (c) above when the weighting function $f(\ )$ is decided as indicated by the following Equation (8):

$$f(p_i)=|p_i| \quad (8)$$

(e) Calculation Method Based Upon Small-Value Exclusion

Figure 8:
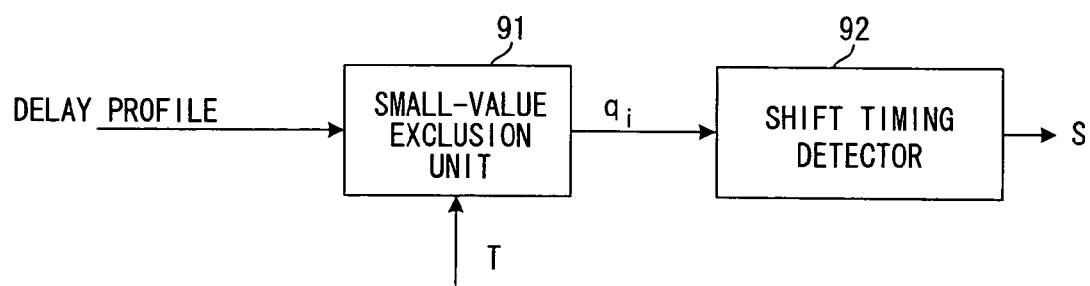
FIG. 8 is a block diagram of a shift timing detector having a small-value exclusion unit.

The delay profile (complex numerical value) $p_i$ is used in detection of the amount of shift after small-value exclusion is performed. If this is done, noise can be eliminated and the accuracy of shift-quantity detection can be improved. FIG. 8 is a block diagram of a shift timing detector having a small-value exclusion unit 91. The arrangement is such that the small-value exclusion unit 91 is provided in front of any of the shift timing detectors 92 of (a) to (d) of FIG. 7. The small-value exclusion unit 91 decides an appropriate threshold value T and adopts $q_i=0$ if $|p_i|^2$ is less than T and $q_i=p_i$ if $|p_i|^2$ is equal to or greater than T. That is, the small-value exclusion unit 91 decides $q_i$ in accordance with the following:

$$q_i=p_i \text{ (when } |p_i|^2 \geq T \text{ holds)} \quad (9)$$

$$q_i=0 \text{ (when } |p_i|^2 < T \text{ holds)} \quad (10)$$

and the shift timing detector 92 obtains the shift quantity s by performing an operation that same as that of (a) to (d) using this $q_i$.

Various methods of deciding the small-value exclusion level T are conceivable. For example, four times the average value of $|p_i|^2$ is adopted as the small-value exclusion level T in accordance with the following equation:

$$T = \frac{4\sum_{i=0}^{N-1}|p_i|^2}{N} \quad (11)$$

Alternatively, one-fourth of the maximum value of $|p_i|^2$ is adopted as the small-value exclusion level T in accordance with the following equation:

$$T=|Pmax|^2/4 \text{ (}|Pmax|^2 \text{ is the maximum value of } p_i\text{)} \quad (12)$$

Figure 9:
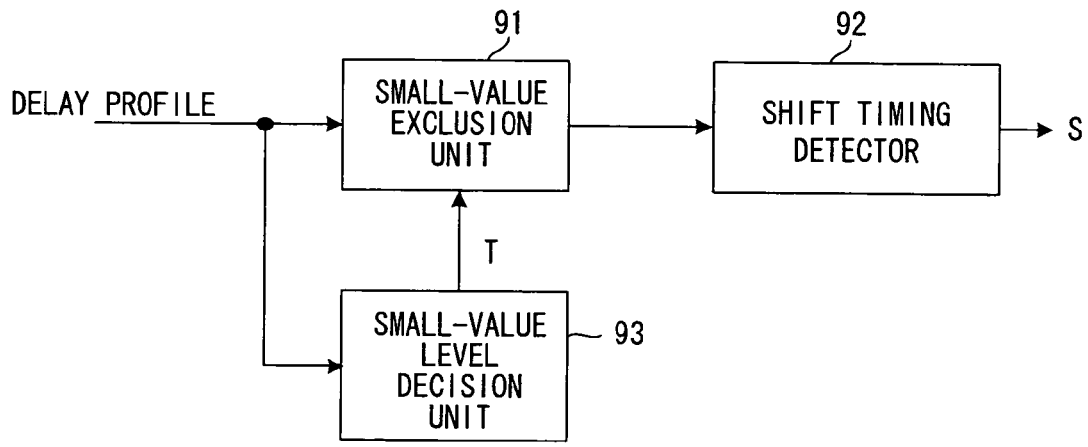
FIG. 9 is a block diagram of a shift timing detector having a small-value exclusion level decision unit in addition to the structure of FIG. 8.

FIG. 9 is a block diagram of a shift timing detector having a small-value level decision unit 93 in addition to the structure of FIG. 8. The small-value level decision unit 93 decides the small-value exclusion level T in accordance with Equation (11) or (12) and inputs the level to the small-value exclusion unit 91. The latter adopts $q_i=0$ if $|p_i|^2$ is less than T and $q_i=p_i$ if $|p_i|^2$ is equal to or greater than T. The shift timing detector 92 obtains the shift quantity by performing an operation the same as that of (a) to (d) using this $q_i$.

(f) Modification of Small-Value Exclusion

The Equations (9), (10) of the small-value exclusion method are modified as follows:

$$q_i=1 \text{ (when } |p_i|^2 \geq T \text{ holds)} \quad (13)$$

$$q_i=0 \text{ (when } |p_i|^2 < T \text{ holds)} \quad (14)$$

and the shift quantity s is obtained in accordance with the following equation using the $q_i$ obtained:

$$s = \frac{\sum_{i=0}^{N-1} i q_i}{\sum_{i=0}^{N-1} q_i} \quad (15)$$

If small-value exclusion is performed upon making such a modification, a simple average delay time (shift quantity) of multipath is obtained. In case of two paths, for example, if we let $t_1$ and $t_2$ represent the timings of respective ones of the delay profiles, a timing $(t_1+t_2)$ at the exact center of the timings of the two paths is obtained as the average delay time (shift quantity s) of the paths, irrespective of the size relationship between the paths, in accordance with the modified method.

(g) Delay-Profile Shift Operation

If a path exists in advance of the FFT window timing, i.e., if a wave arrives earlier than the FFT window timing, the delay profile conforming to this path will appear at the tail end, as shown in (b) of FIG. 4. In such case a delay profile will not exist at the correct position and, as a consequence, the shift quantity can no longer be detected. This will be described in accordance with FIG. 10. For example, when there are two paths as shown in (a) of FIG. 10, delay profiles $P_A$, $P_B$ of paths A, B appear at the positions of the solid lines in (b) of FIG. 10 in a case where start timing WT of the FFT window timing is exactly midway between the two paths A, B. Consequently, if the shift quantity s is obtained by weighting, then s will be in the vicinity of the center of the delay-profile range, as illustrated in (b) of FIG. 10. Since the desired shift quantity s is in the vicinity of 0, this is not desirable. Accordingly, s is found after the delay profiles $P_A$, $P_B$ of paths A, B have first been shifted to $P_A'$, $P_B'$ by $s_p$, as shown in (c) of FIG. 10, and the accurate shift quantity s is found by subsequently returning it to the original as $s=s-s_p$.

Figure 11:
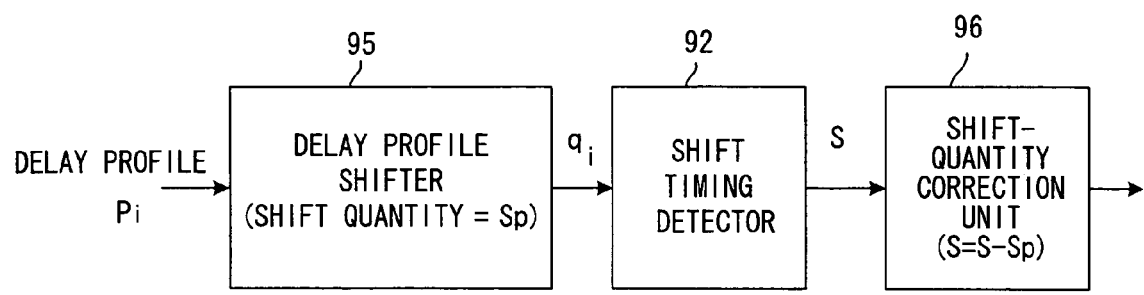
FIG. 11 is a block diagram of a shift timing detector having means for shifting a delay profile.
Figure 12:
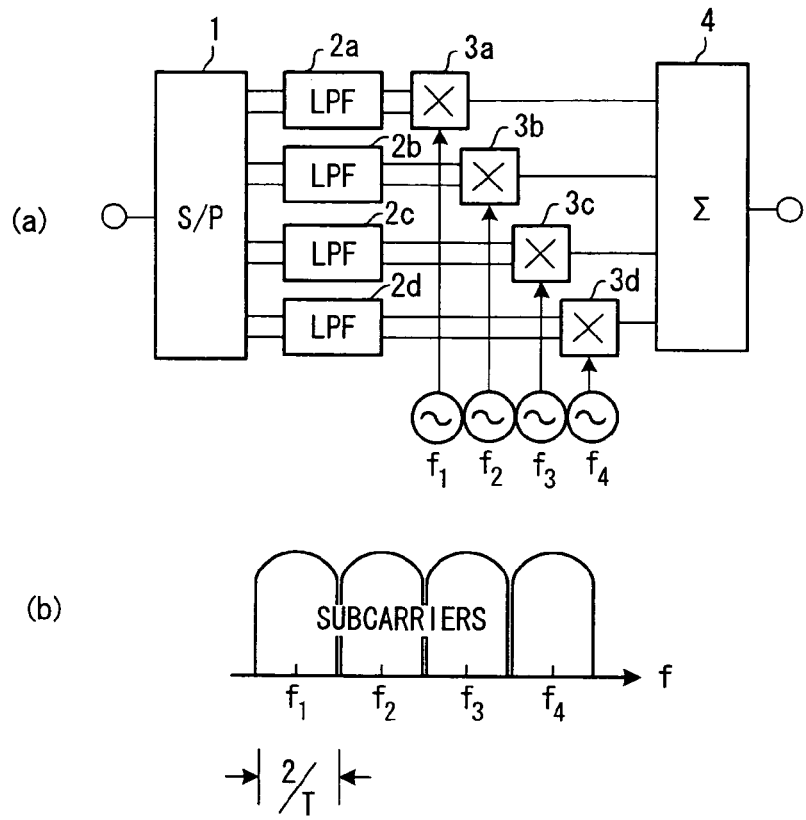
FIG. 12 is a diagram useful in describing a multicarrier transmission scheme according to the prior art.
Figure 13:
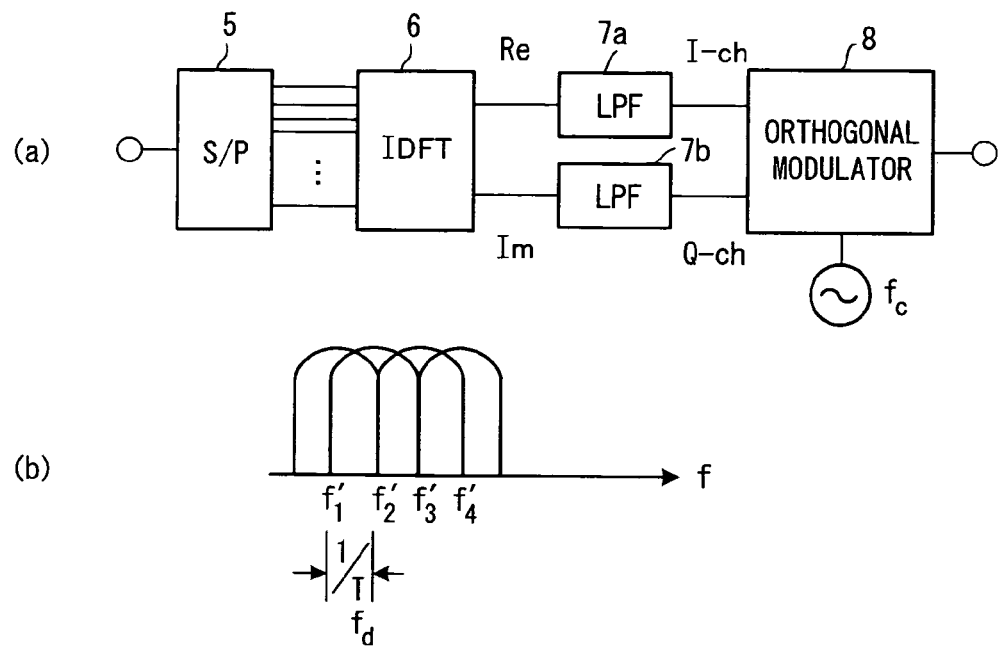
FIG. 13 is a diagram useful in describing an orthogonal frequency division multiplexing scheme according to the prior art.
Figure 14:
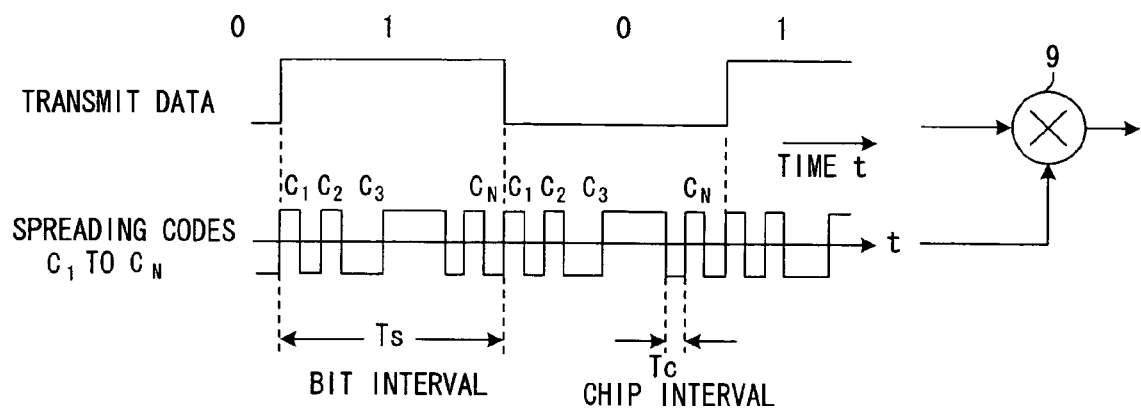
FIG. 14 is a diagram useful in describing code spreading modulation in CDMA.
Figure 15:
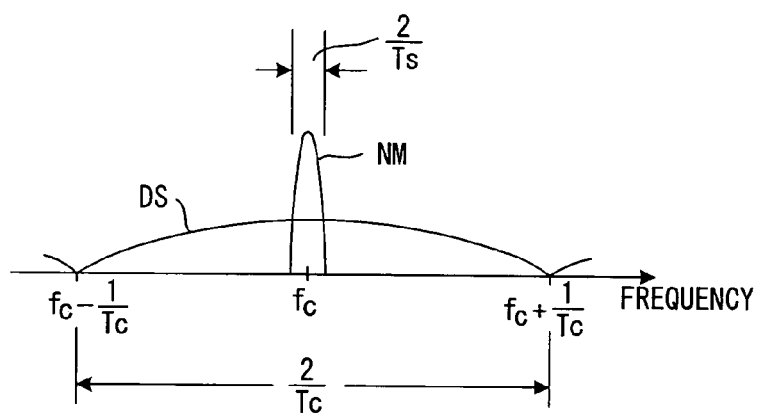
FIG. 15 is a diagram useful in describing spreading of a band in CDMA.
Figure 16:
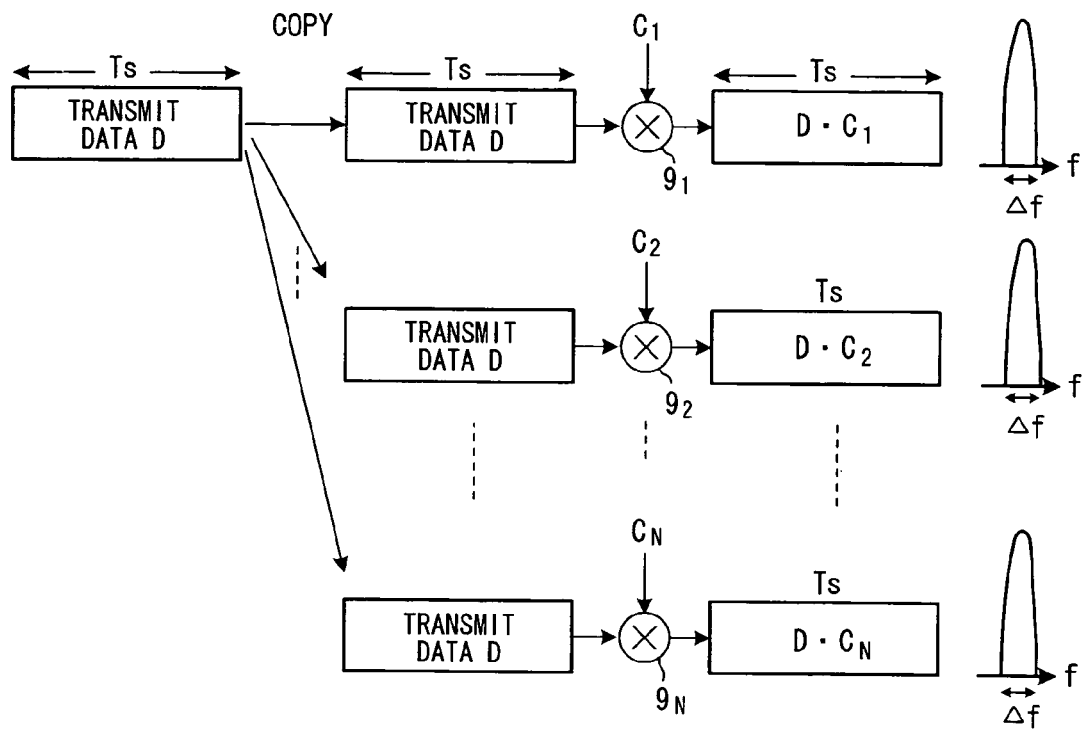
FIG. 16 is a diagram useful in describing the principle of a multicarrier CDMA scheme.
Figure 17:
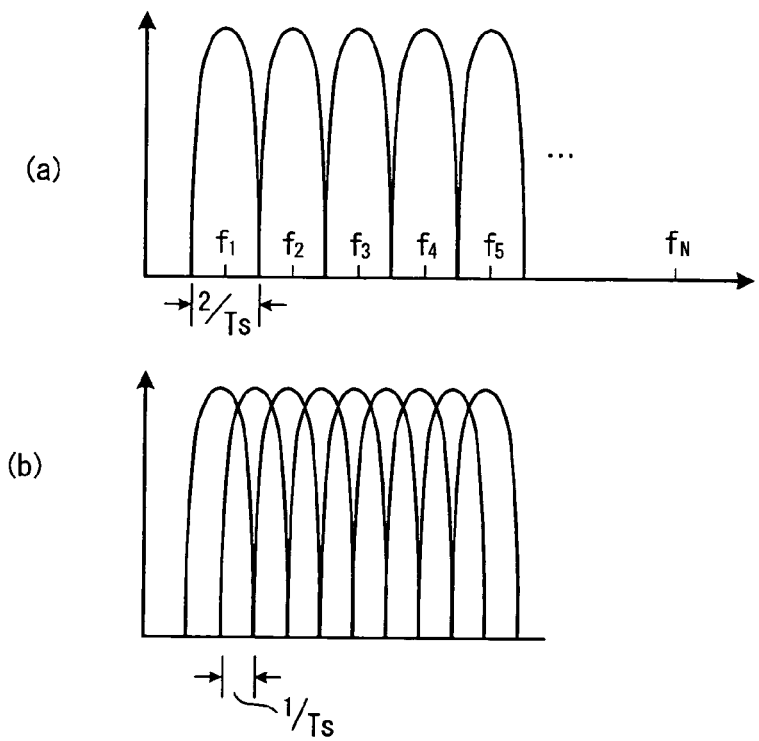
FIG. 17 is a diagram useful in describing placement of subcarriers.
Figure 18:
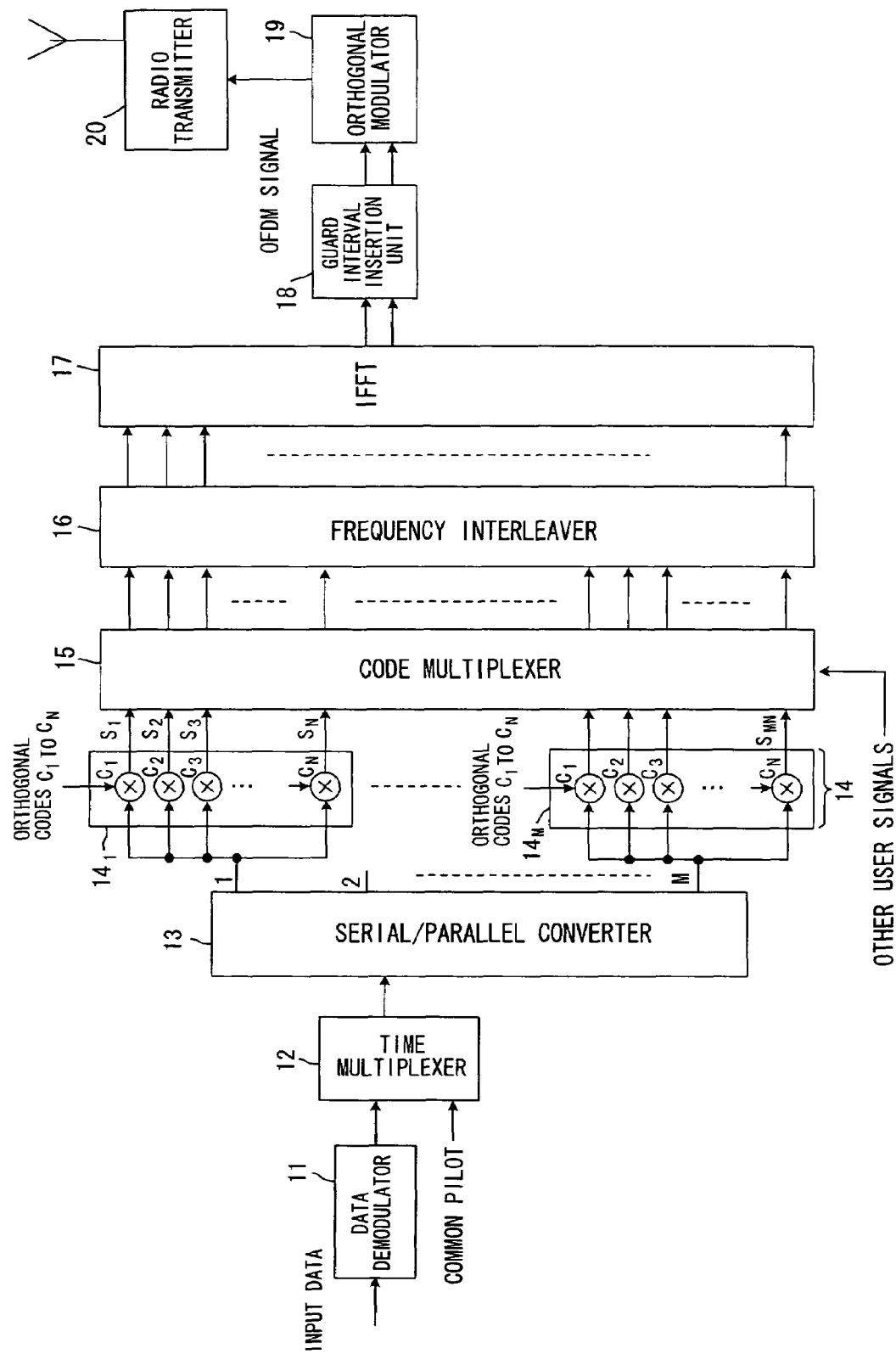
FIG. 18 is a block diagram of a transmitting side in MC-CDMA according to the prior art.
Figure 19:
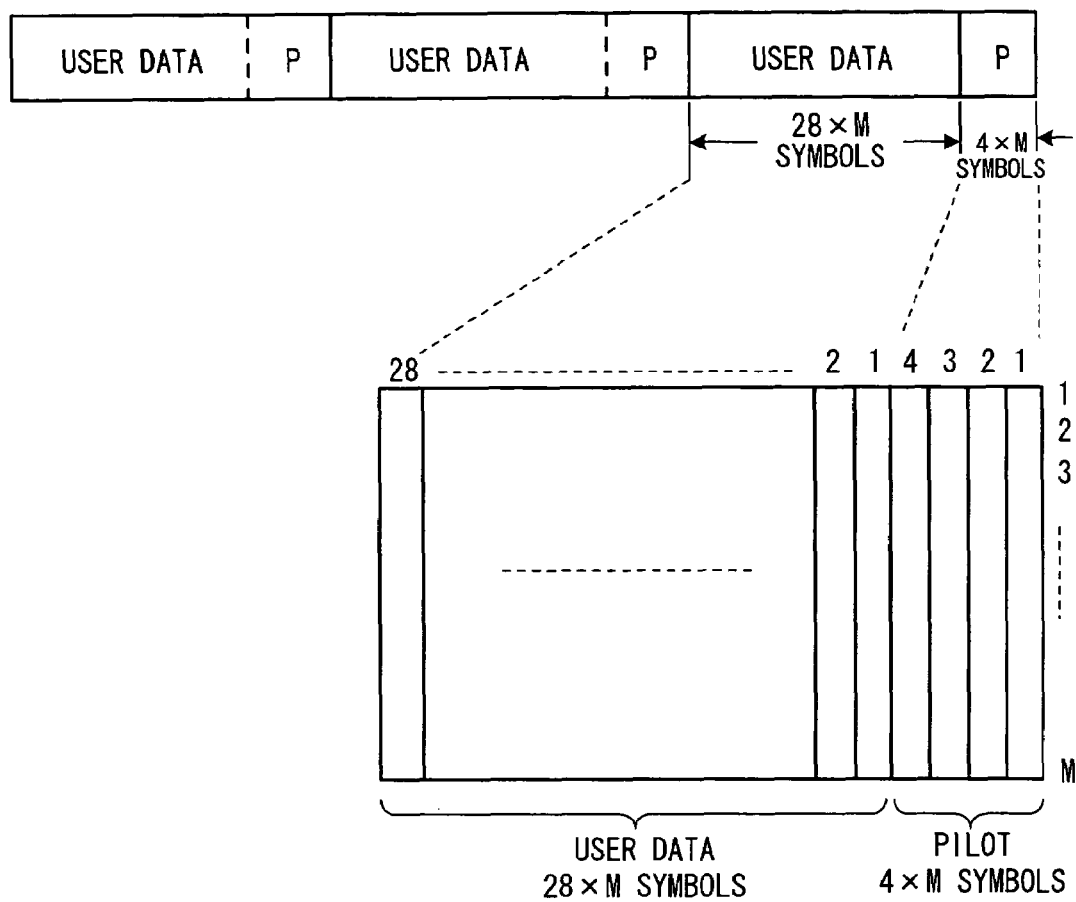
FIG. 19 is a diagram useful in describing a serial-to-parallel conversion.
Figure 20:
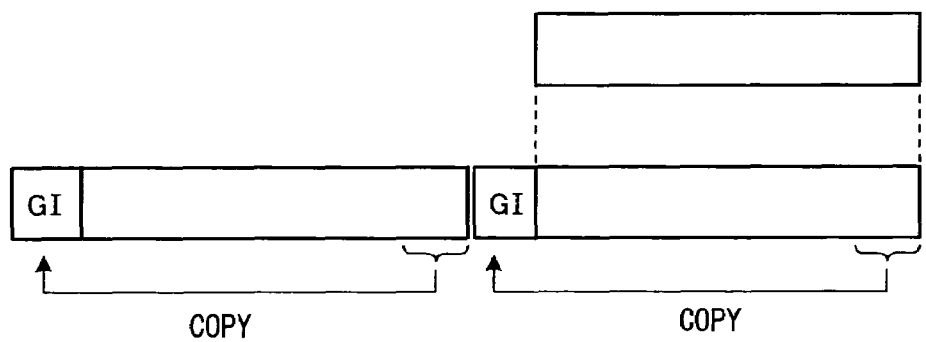
FIG. 20 is a diagram useful in describing a guard interval.

FIG. 11 is a block diagram of a shift timing detector having means for shifting a delay profile. A delay profile shifter 95 shifts a delay profile $p_i$ [i=0, ..., (N−1)] by $s_p$ in accordance with the following equation:

$$q_i=p_k$$

$$\text{where } k=(i+s_p) \bmod N \text{ [i=0, ..., (N−1)]} \quad (16)$$

to obtain $q_i$, after which the shift timing detector 92 of any of FIGS. 7(a) to (d) and FIGS. 8, 9 obtains a provisional shift quantity s using this $q_i$. After the provisional shift quantity s has been obtained, a shift-quantity correction unit 96 diminishes the shift quantity s by $s_p$ in accordance with the following equation to thereby calculate and output the rightful s:

$$s=s-s_p \quad (17)$$

Since it will suffice for the shift quantity $s_p$ to be sufficiently larger than the spread of the delay profile (the maximum delay time), it is believed that the shift quantity should be twice the length of the guard interval.

Thus, in accordance with the present invention, inter-symbol interference ISI can be eliminated, the average value of FFT enlarged, the amplitude of rotation reduced and channel estimation performed correctly.

What is claimed is:

1. An OFDM receiving method for receiving a signal that has undergone Orthogonal Frequency Division Multiplexing (OFDM) and applying Fast Fourier Transform (FFT) processing to the receive signal to demodulate transmit data, comprising:

extracting, at an OFDM symbol extraction unit, an OFDM symbol comprising a fixed number of sample data from the receive signal;

obtaining a path of maximum power among multipath and a shift quantity S that corresponds to a delay time from a direct path to the path of maximum power;

shifting, at an FFT processing position shifter, by S number of samples, a position at which the FFT processing of the OFDM symbol starts;

applying the FFT processing to the OFDM symbol from the position to which the shift has been made;

storing an OFDM symbol, which comprises a fixed number of items of sample data, in a buffer memory; and reading sample data out of the buffer memory in order from an address that conforms to the FFT-processing starting position to which the shift has been made, inputting the data to an FFT processing unit and, when the data has been read out to the end of the buffer, subsequently reading sample data out of the buffer from the beginning thereof and inputting the data to the FFT processing unit, thereby shifting the FFT-processing starting position.

2. An OFDM receiving method for receiving a signal that has undergone Orthogonal Frequency Division Multiplexing (OFDM) and applying Fast Fourier Transform (FFT) processing to the receive signal to demodulate transmit data, comprising:
  extracting, at an OFDM symbol extraction unit, an OFDM symbol comprising a fixed number of sample data from the receive signal;
  shifting, at an FFT processing position shifter, based upon a path of maximum power among multipath, a position at which the FFT processing of the OFDM symbol starts;
  applying the FFT processing to the OFDM symbol from the position to which the shift has been made;
  obtaining a channel estimation value from result of the FFT processing of known data contained in the receive signal;
  obtaining delay profiles of multipath by applying Inverse Fast Fourier Transform (IFFT) processing to the channel estimation value; and
  obtaining said path of maximum power among multipath using these delay profiles and obtaining a shift quantity S that corresponds to a delay time from a direct path to the path of maximum power,
  wherein said shifting step includes shifting the position at which the FFT processing of the OFDM symbol starts by S number of samples.

3. An OFDM receiving method according to claim 2, further comprising weighting the position of each path using the power of the delay profile of each path and deciding the FFT-processing starting position based upon a position obtained by weighting and averaging.

4. An OFDM receiving method according to claim 2, further comprising weighting the position of each path using the amplitude of the delay profile of each path and deciding the FFT-processing starting position based upon a position obtained by weighting and averaging.

5. An OFDM receiving method according to claim 2, further comprising weighting the position of each path using a weighting function in which a delay profile value is a variable, and deciding the FFT-processing starting position based upon a position obtained by weighting and averaging.

6. An OFDM receiving method according to claim 2, further comprising comparing the delay profile of each path of multipath with a set level and, if the delay profile is less than the set level, deciding the FFT-processing starting position upon adopting 0 as the delay profile.

7. An OFDM receiving method according to claim 2, further comprising:
  delaying the delay profile of each path of multipath by a predetermined time in advance; and
  obtaining a provisional FFT-processing starting position based upon the delay profile that has been delayed by the predetermined time, and calculating a rightful FFT-processing starting position by advancing the provisional FFT-processing starting position by the predetermined time.

8. An OFDM receiving apparatus for receiving a signal that has undergone Orthogonal Frequency Division Multiplexing (OFDM) and applying Fast Fourier Transform (FFT) processing to the receive signal to demodulate transmit data, comprising:
  an OFDM symbol extraction unit to extract an OFDM symbol comprising a fixed number of sample data from the receive signal;
  a unit to obtain a path of maximum power among multipath and a shift quantity S that corresponds to a delay time from a direct path to the path of maximum power;
  an FFT-processing starting position shift unit to shift, by S number of samples, a position at which the FFT processing of the OFDM symbol starts;
  an FFT-processing starting position controller to cause the FFT processing to be performed from the FFT-processing starting position; and
  an FFT processing unit to apply the FFT processing, wherein said FFT-processing starting position controller includes:
  a buffer memory to store the extracted OFDM symbol comprising a fixed number of items of sample data; and
  controller to read sample data out of the buffer memory in order from an address that conforms to the FFT-processing starting position that has been decided, inputting the data to the FFT processing unit and, when the data has been read out to the end of the buffer, subsequently reading remaining sample data out of the buffer from the beginning thereof and inputting the data to the FFT processing unit.

9. An OFDM receiving apparatus for receiving a signal that has undergone Orthogonal Frequency Division Multiplexing (OFDM) and applying Fast Fourier Transform (FFT) processing to the receive signal to demodulate transmit data, comprising:
  an OFDM symbol extraction unit to extract an OFDM symbol comprising a fixed number of items of sample data from the receive signal;
  an FFT-processing starting position shift unit to shift, based upon a path of maximum power among multipath, a position at which the FFT processing of the OFDM symbol starts;
  an FFT-processing starting position controller to cause the FFT processing to be performed from the FFT-processing starting position; an FFT processing unit to apply the FFT processing;
  a channel estimation unit to calculate a channel estimation value from result of the FFT processing of known data contained in the receive signal;
  an Inverse Fast Fourier Transform (IFFT) processing unit to obtain a delay profile of each path by applying IFFT processing to the channel estimation value; and
  a unit to obtain path of maximum power among multipath using the delay profile and to obtain a shift quantity S that corresponds to a delay time from a direct path to the path of maximum power,
  wherein said FFT-processing starting position shift unit shifts the position at which the FFT processing of the OFDM symbol starts by S number of samples.

10. An OFDM receiving apparatus according to claim 9, wherein said detection unit compares the delay profile of each path with a set level and, if the delay profile is less than the set level, decides the FFT-processing starting position upon adopting 0 as the delay profile.

11. An OFDM receiving apparatus according to claim 9, wherein said detection unit delays the delay profile of each path of multipath by a predetermined time in advance, obtains a provisional FFT-processing starting position based upon the delay profile that has been delayed by the predetermined time, and calculates a rightful FFT-processing starting position by advancing the provisional FFT-processing starting position by the predetermined time.

* * * * *

UNITED STATES PATENT AND TRADEMARK OFFICE
CERTIFICATE OF CORRECTION

| | |
|---|---|
| PATENT NO. | : 7,693,035 B2 |
| APPLICATION NO. | : 10/792515 |
| DATED | : April 6, 2010 |
| INVENTOR(S) | : Tsuyoshi Hasegawa et al. |

It is certified that error appears in the above-identified patent and that said Letters Patent is hereby corrected as shown below:

Title Page;

The following are added to the front page of the patent in the left column:

-- (63)   Related U.S. Application Data

Continuation of application No. PCT/JP01/08487, filed on Sept. 28, 2001. --

Signed and Sealed this
Fifteenth Day of February, 2011

David J. Kappos
*Director of the United States Patent and Trademark Office*